(12) United States Patent
Cho

(10) Patent No.: US 10,512,379 B2
(45) Date of Patent: Dec. 24, 2019

(54) CLEANER AND DUST SEPARATING DEVICE APPLYING THE SAME

(71) Applicant: Samsung Electronics Co., Ltd., Gyeonggi-do (KR)

(72) Inventor: Dong Jin Cho, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 128 days.

(21) Appl. No.: 15/502,465

(22) PCT Filed: Jul. 30, 2015

(86) PCT No.: PCT/KR2015/007983
§ 371 (c)(1),
(2) Date: Feb. 7, 2017

(87) PCT Pub. No.: WO2016/021874
PCT Pub. Date: Feb. 11, 2016

(65) Prior Publication Data
US 2018/0213989 A1   Aug. 2, 2018

(30) Foreign Application Priority Data

Aug. 7, 2014 (KR) ................. 10-2014-0101679
Jan. 15, 2015 (KR) ................. 10-2015-0007504

(51) Int. Cl.
*B01D 46/10* (2006.01)
*B01D 45/16* (2006.01)
(Continued)

(52) U.S. Cl.
CPC ............. *A47L 9/1691* (2013.01); *A47L 9/106* (2013.01); *A47L 9/165* (2013.01); *A47L 9/1625* (2013.01);
(Continued)

(58) Field of Classification Search
CPC ........ B01D 59/00; B01D 50/00; B01D 45/16; B01D 46/10; B01D 50/002; A47L 9/1683;
(Continued)

(56) References Cited

U.S. PATENT DOCUMENTS 7,175,682 B2 * 2/2007 Nakai ................... A47L 9/1683
15/350
7,444,712 B2 * 11/2008 Wiedemann ............ A47L 9/127
15/347
(Continued)

FOREIGN PATENT DOCUMENTS

EP    1692992 A1   8/2006
EP    2674088 A2   12/2013
(Continued)

OTHER PUBLICATIONS

IP Australia Examination report No. 2 for standard patent application regarding Application No. 2015299924, dated Feb. 12, 2018, 3 pages.
(Continued)

*Primary Examiner* — Minh Chau T Pham

(57) ABSTRACT

Provided is a cleaner including a dust collecting device for separating dust from air, wherein the dust collecting device includes a dust collecting case having a dust discharging port opened to discharge the collected dust; a discharge cover coupled to one side of the dust collecting case to open and close the dust discharge port; and a sealing member provided to extend from an inner surface of the dust collecting case to a coupling surface of the dust collecting case while being in contact with the dust collecting case and thus to be sealed when the dust discharging port is closed.

19 Claims, 31 Drawing Sheets

(51) Int. Cl.
*A47L 9/16* (2006.01)
*A47L 9/10* (2006.01)
*B01D 50/00* (2006.01)

(52) U.S. Cl.
CPC ........... *A47L 9/1641* (2013.01); *A47L 9/1666* (2013.01); *A47L 9/1683* (2013.01); *B01D 45/16* (2013.01); *B01D 46/10* (2013.01); *B01D 50/002* (2013.01)

(58) Field of Classification Search
CPC ...... A47L 9/1608; A47L 9/127; A47L 9/1666; A47L 9/1633; A47L 9/1691; A47L 9/1625; A47L 9/106; A47L 9/165; A47L 9/1641
USPC ....... 55/429, 433, 502, DIG. 3; 15/350, 347, 15/352, 353, 300.1
See application file for complete search history.

(56) References Cited

U.S. PATENT DOCUMENTS

| | | | |
|---|---|---|---|
| 8,402,599 B2* | 3/2013 | Charlton | A47L 9/1683 15/352 |
| 8,443,486 B2* | 5/2013 | Yamaura | A47L 9/1666 15/347 |
| 8,728,188 B2* | 5/2014 | Kim | A47L 5/362 55/429 |
| 9,009,914 B2* | 4/2015 | Tran | A47L 9/1633 15/353 |
| 2004/0112022 A1* | 6/2004 | Vuijk | A47L 9/1625 55/429 |
| 2005/0132530 A1 | 6/2005 | Macleod et al. | |
| 2006/0137305 A1* | 6/2006 | Jung | A47L 5/362 55/337 |
| 2007/0209150 A1 | 9/2007 | Gogel et al. | |
| 2008/0047091 A1* | 2/2008 | Nguyen | A47L 9/1608 15/300.1 |
| 2009/0100633 A1* | 4/2009 | Bates | A47L 9/1633 15/347 |
| 2011/0056045 A1 | 3/2011 | Sepke et al. | |
| 2012/0047858 A1 | 3/2012 | Kim et al. | |

FOREIGN PATENT DOCUMENTS

| | | |
|---|---|---|
| KR | 10-2006-0086088 A | 7/2006 |
| WO | 2012031084 A1 | 3/2012 |

OTHER PUBLICATIONS

Extended European Search Report regarding Application No. 15829745.7, dated Apr. 16, 2018, 7 pages.
European Patent Office, "Communication pursuant to Article 94(3) EPC," Application No. EP 15829745.7, dated Dec. 13, 2018, 5 pages.
The State Intellectual Property Office of the People's Republic of China, "the First office Action," Application No. CN 201580042498.0, dated Nov. 15, 2018, 12 pages.
ISA/KR, "International Search Report," International Application No. PCT/KR2015/007983, dated Oct. 29, 2015, 4 pages.
ISA/KR, "Written Opinion of the International Searching Authority," International Application No. PCT/KR2015/007983, dated Oct. 29, 2015, 7 pages.
Australian Government IP Australia, "Examination report No. 1 for standard patent application," Australian Application No. AU 2015299924, dated Oct. 1, 2017, 3 pages.
European Patent Office, "Communication pursuant to Rules 161(2) and 162 EPC," European Application No. EP 15829745.7, dated Mar. 14, 2017, 2 pages.
Notice of acceptance for patent application dated Jul. 2, 2018 in connection with Australian Patent Application No. 2015299924.
China National Intellectual Property Administration, Office Action for Application No. 201580042498.0, dated Jul. 8, 2019, 7 pages.
European Patent Office, "Communication under Rule 71(3) EPC," Application No. EP 15829745.7, dated Aug. 29, 2019, 66 pages.
Korean Intellectual Property Office, "Notice of Preliminary Rejection," Application No. KR 10-2015-0007504, dated Aug. 30, 2019, 7 pages.

* cited by examiner

[Fig. 1]
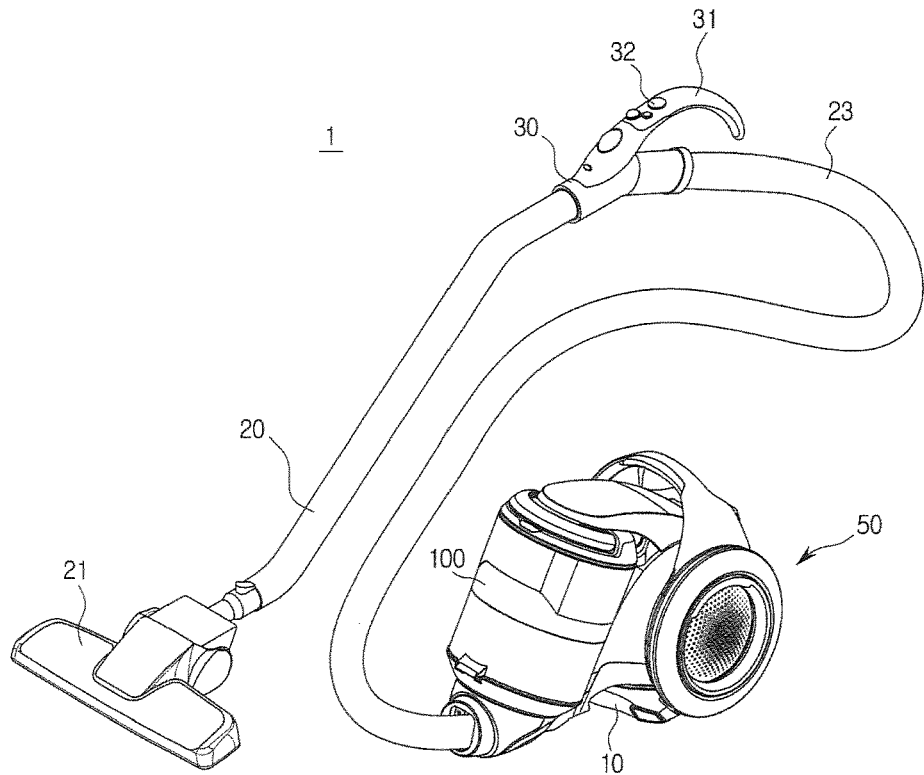
[Fig. 2]
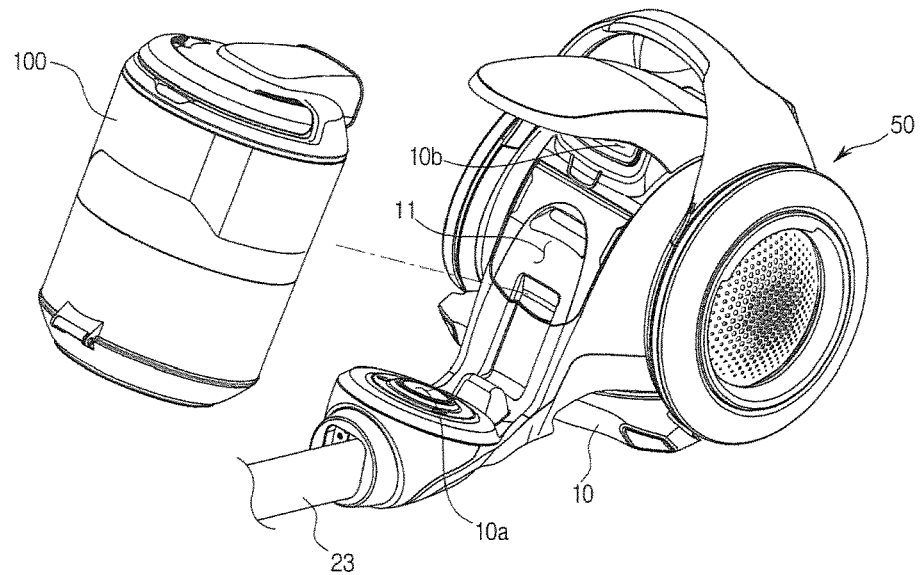

[Fig. 3]
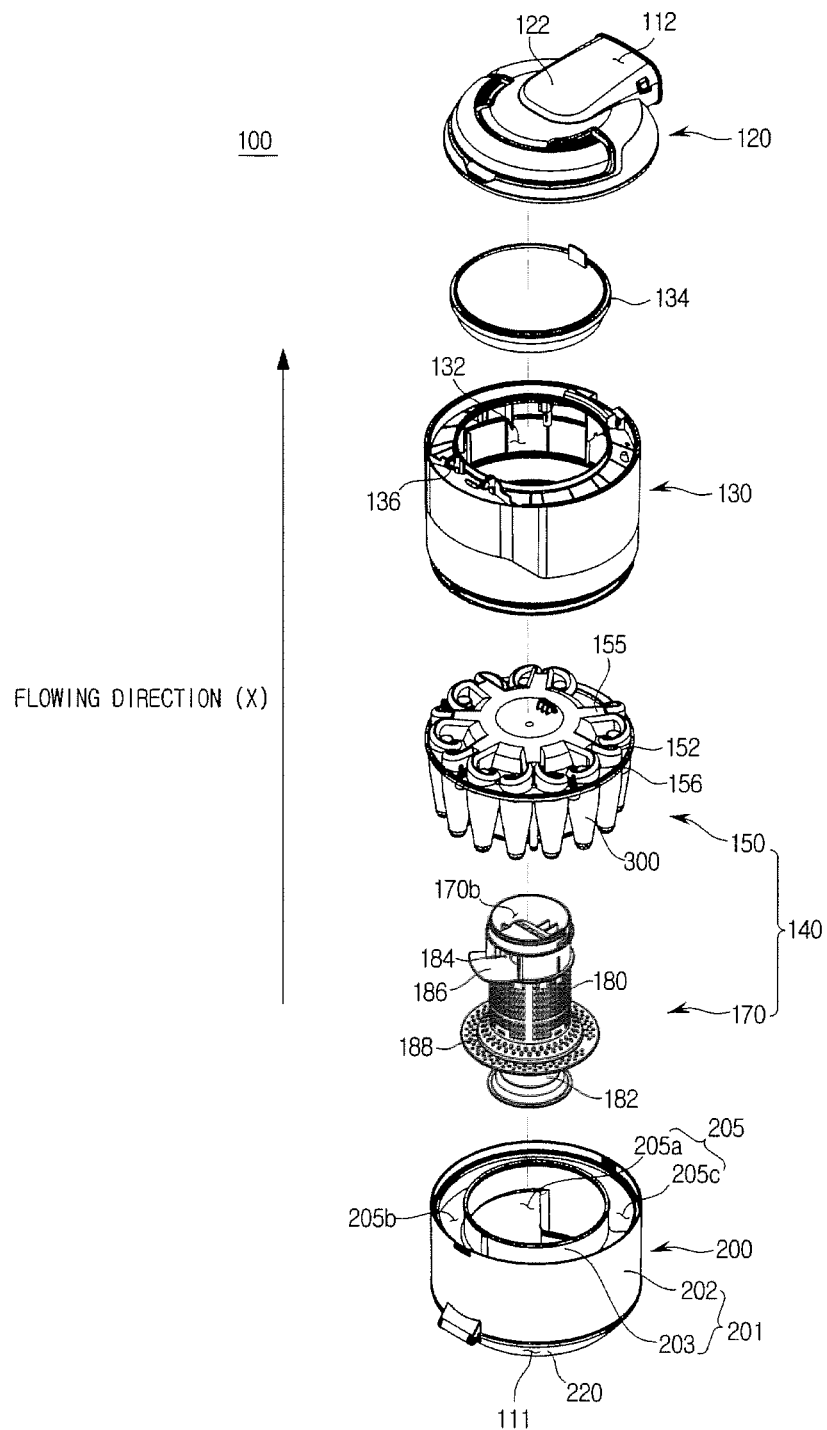

[Fig. 4]
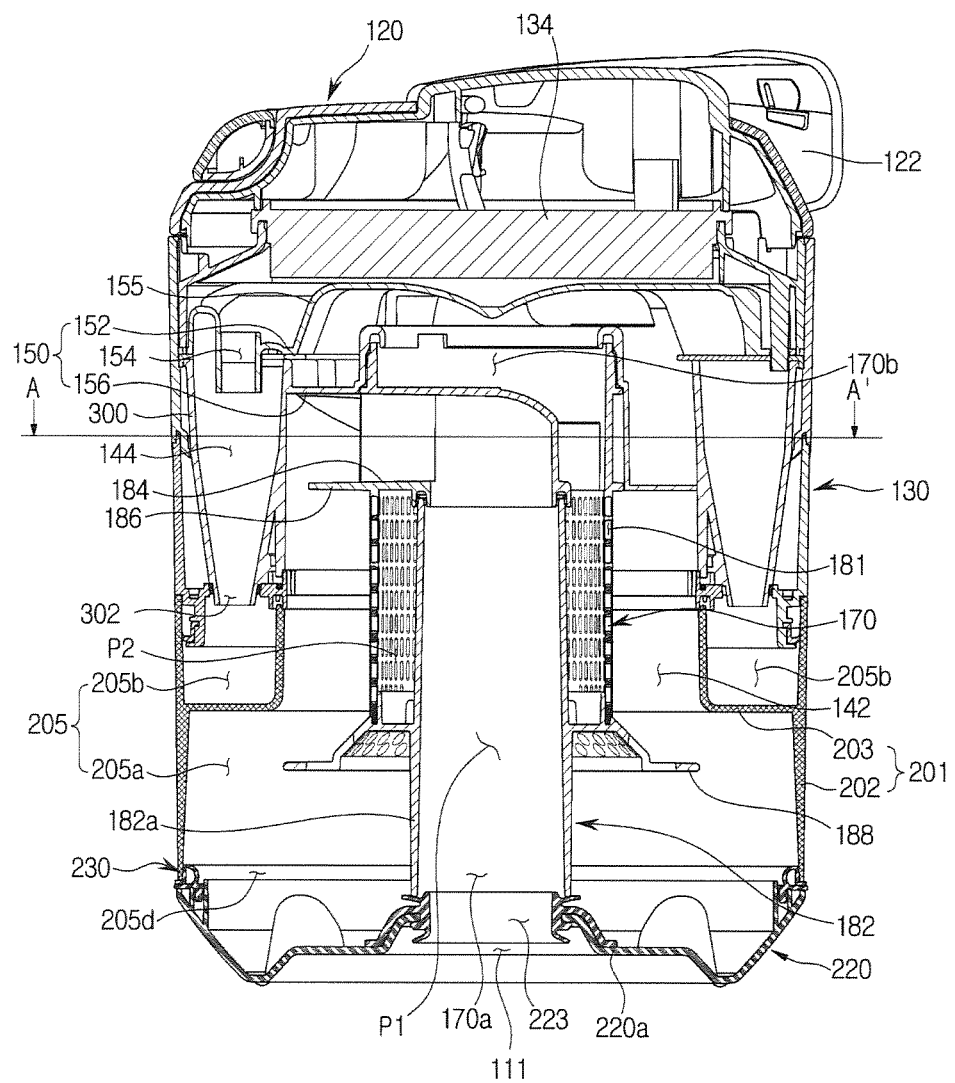

[Fig. 5]
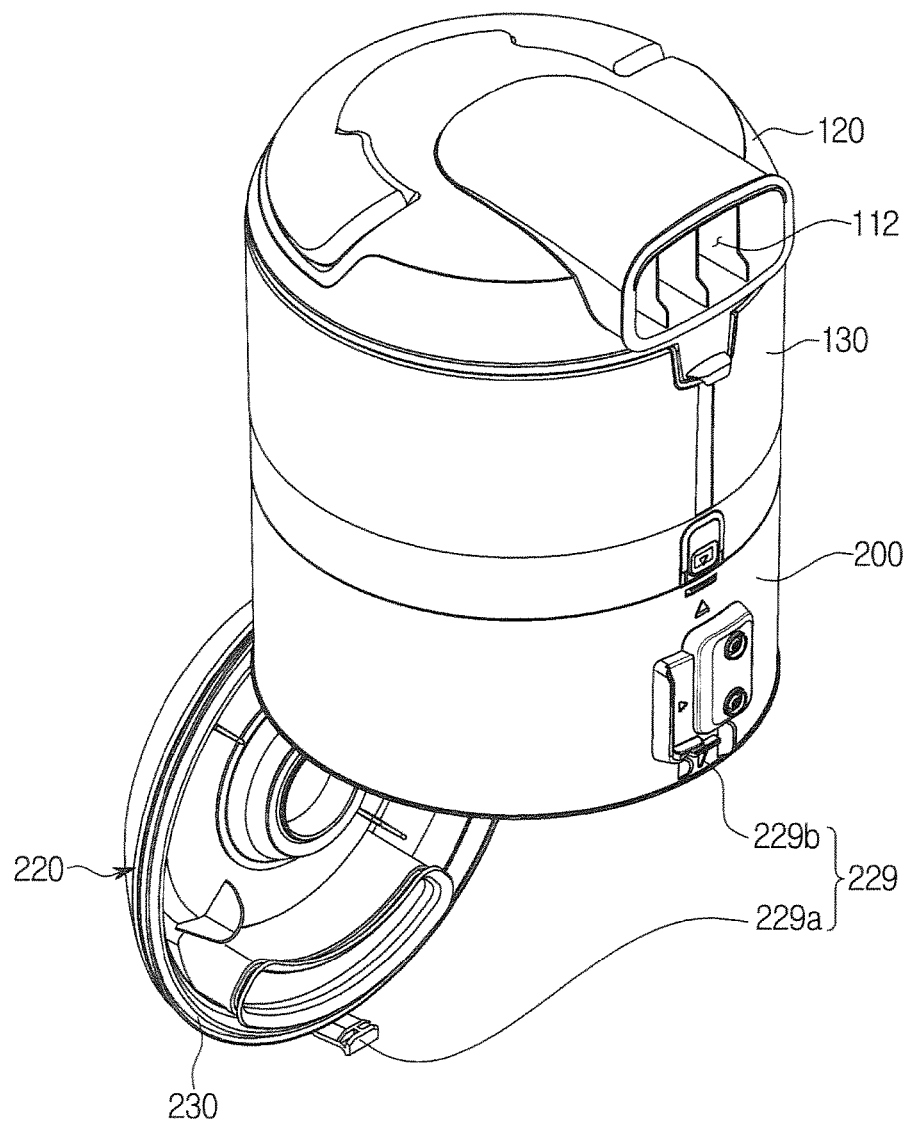

[Fig. 6]
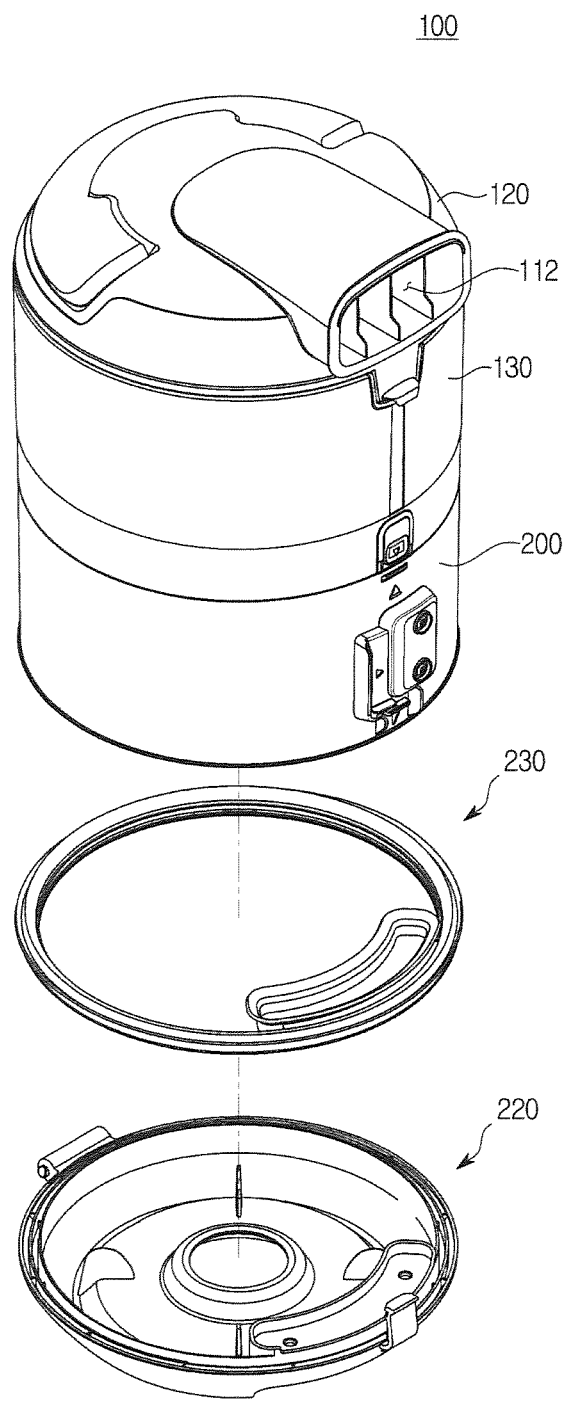

[Fig. 7]
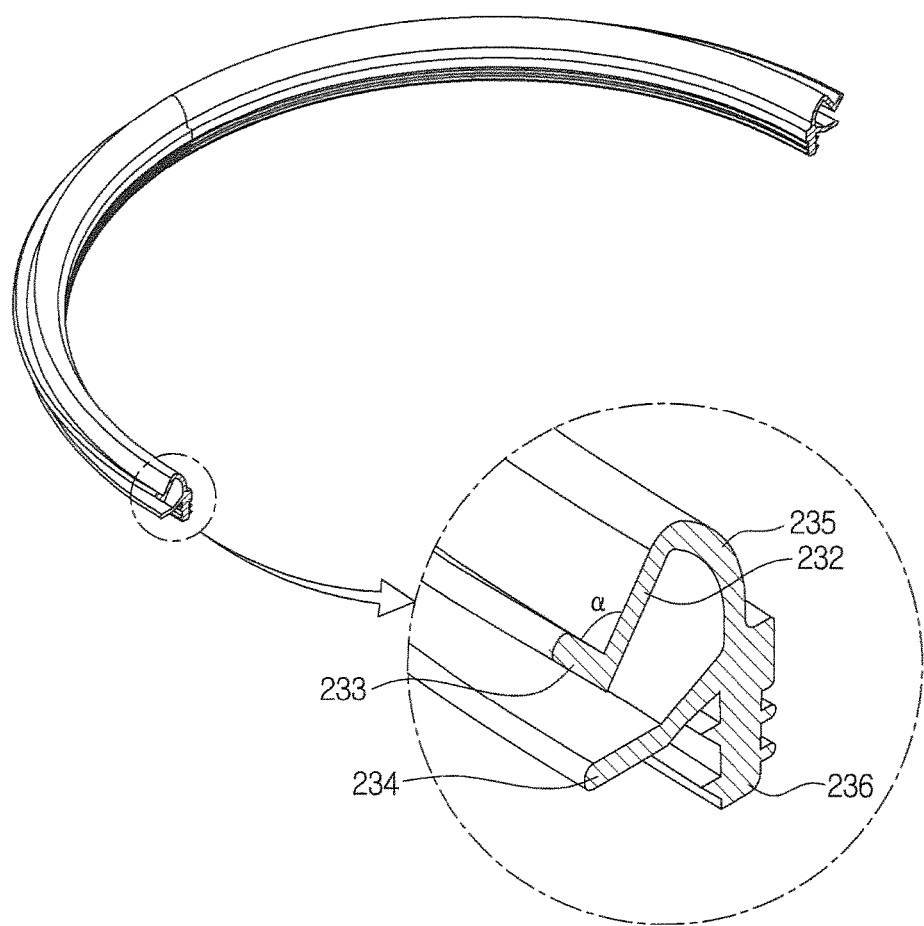

[Fig. 8]
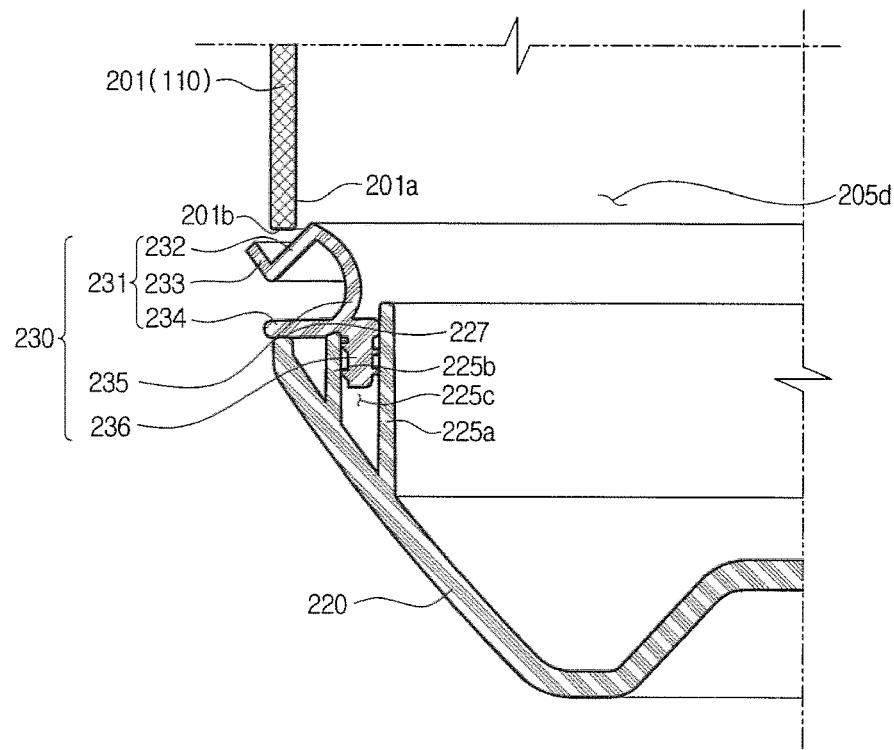
[Fig. 9]
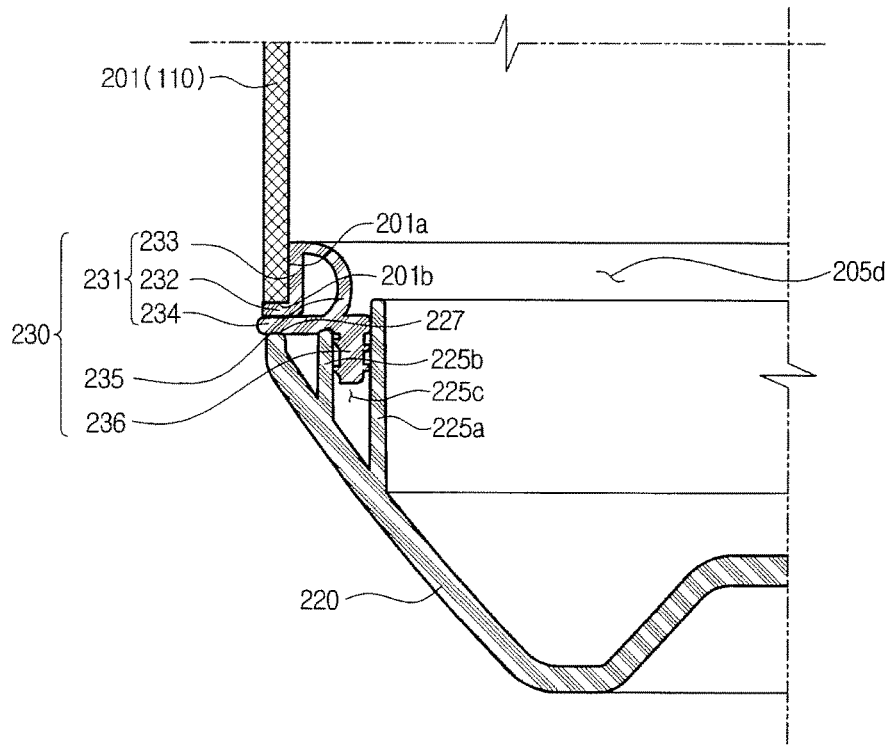

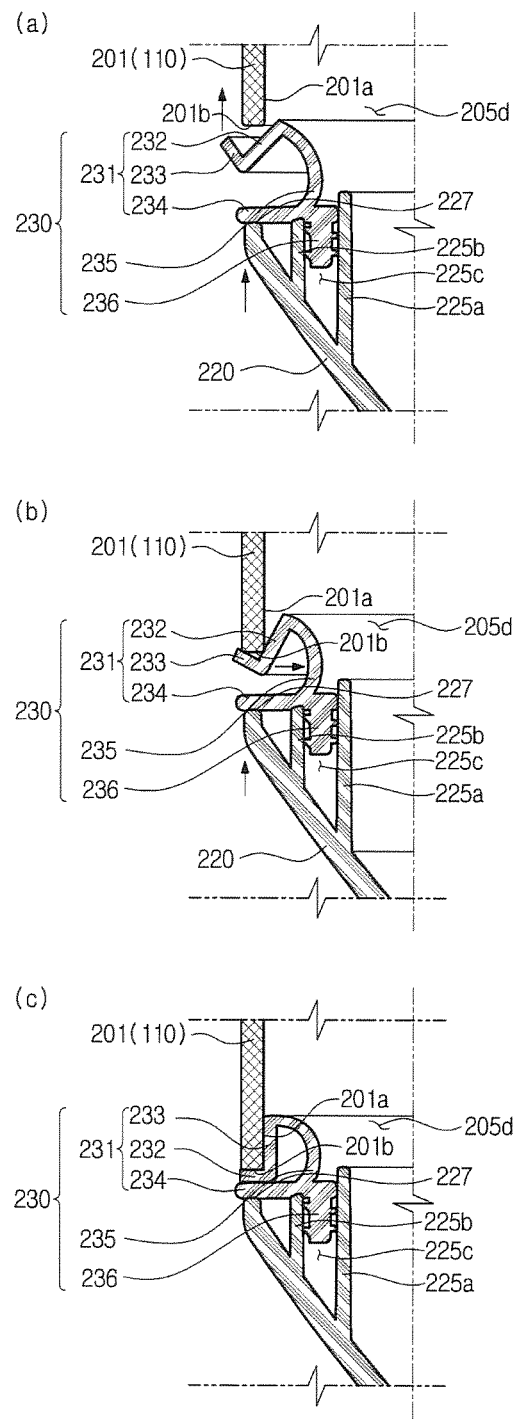

[Fig. 11]
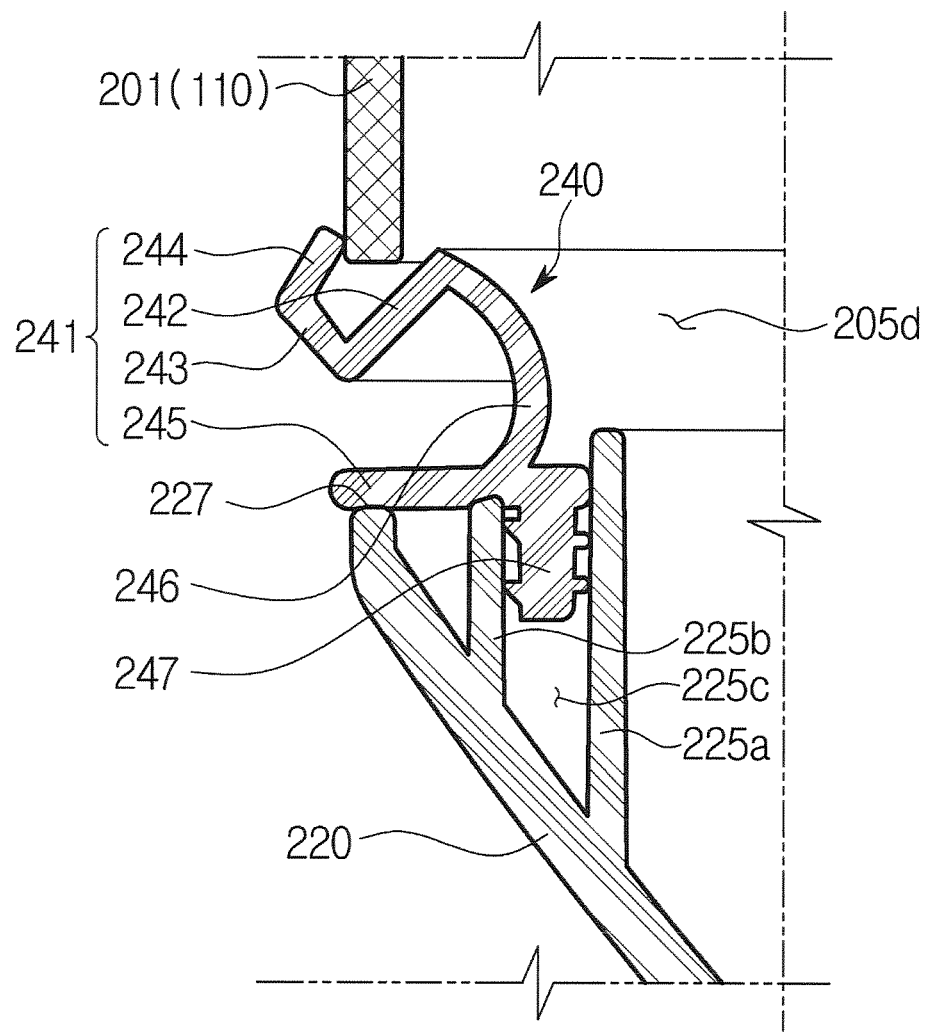

[Fig. 12]
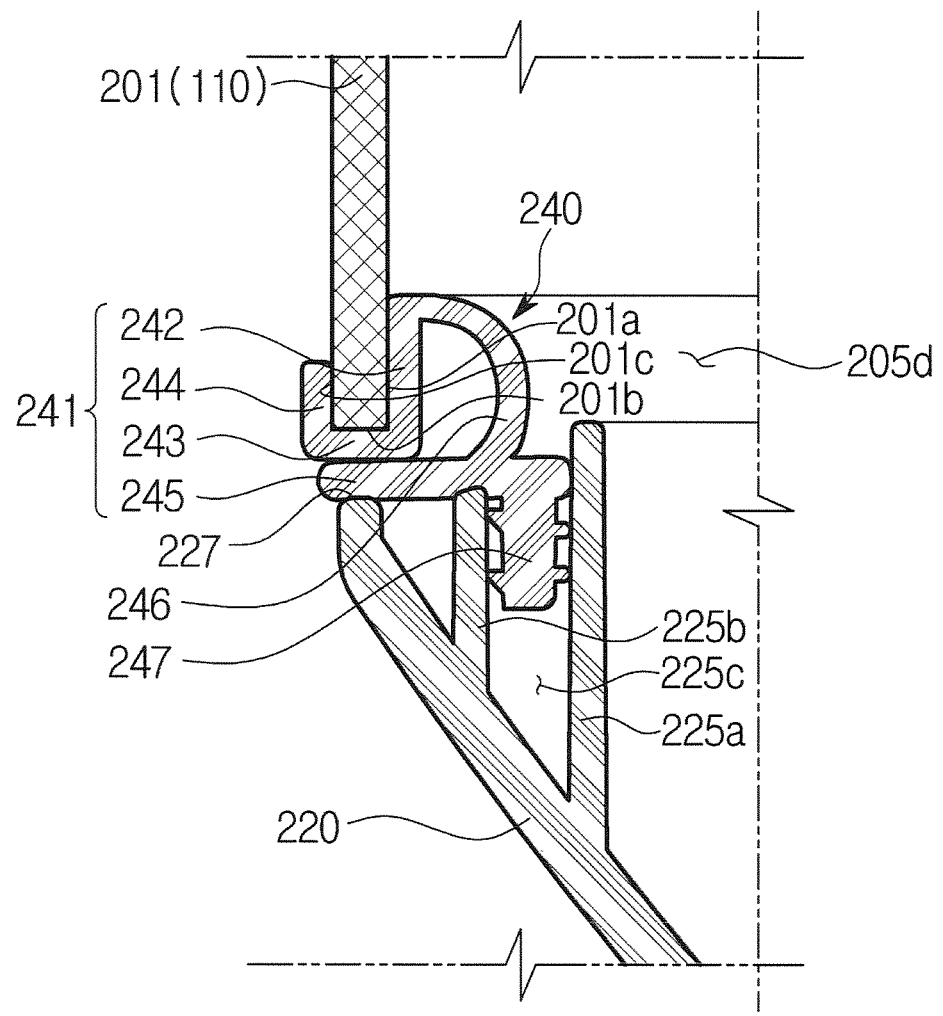

[Fig. 13]
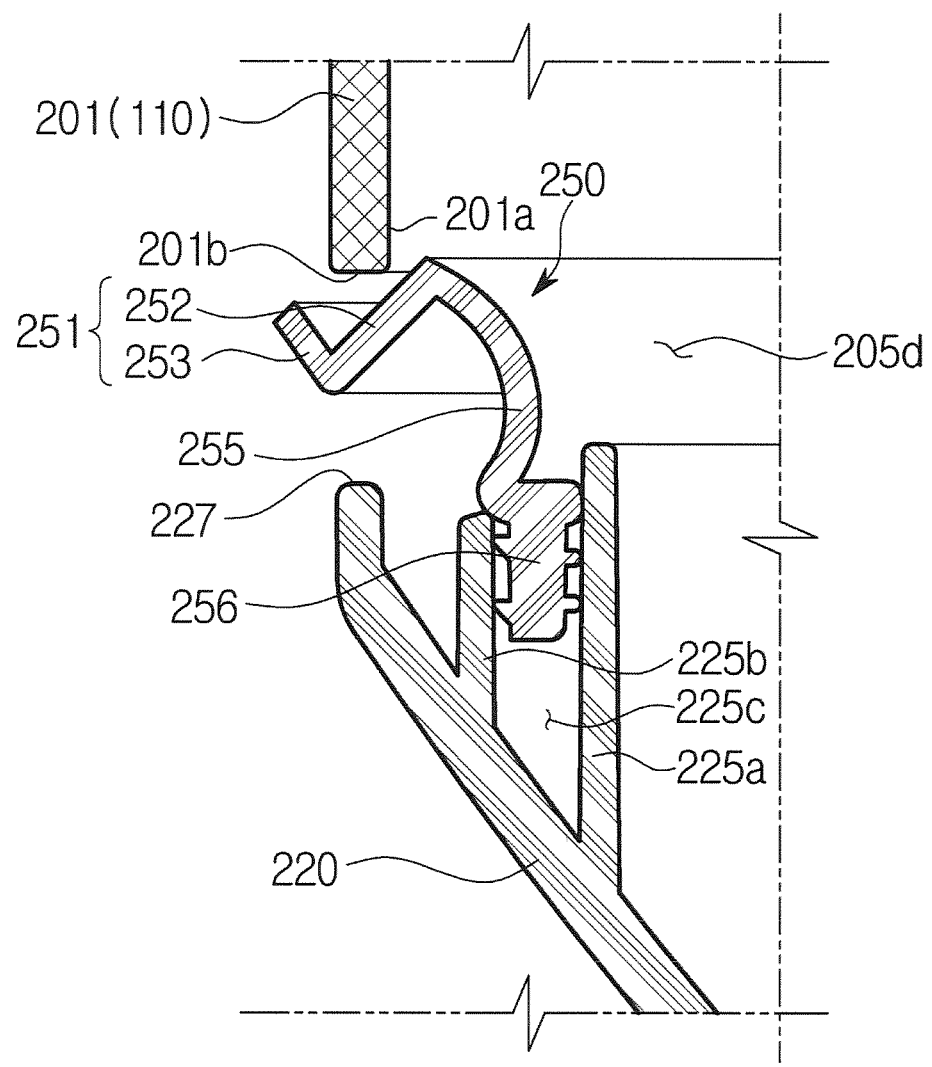

[Fig. 14]
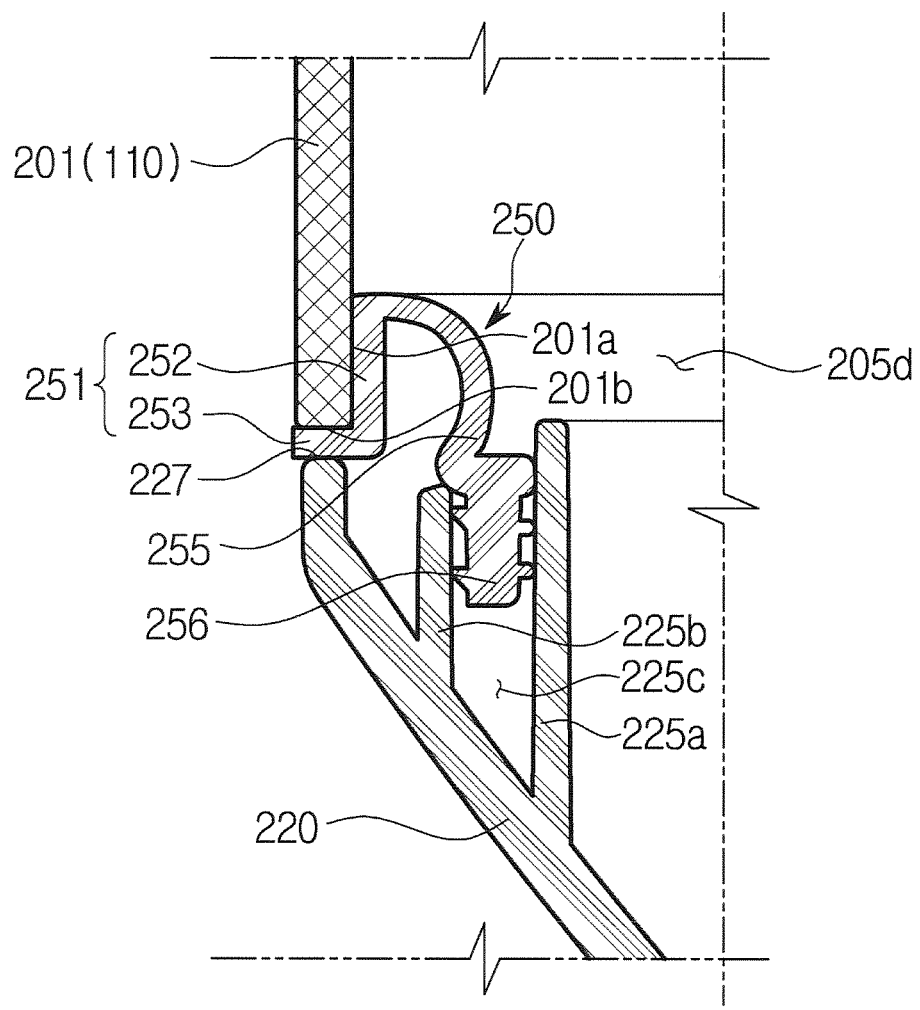

[Fig. 15]
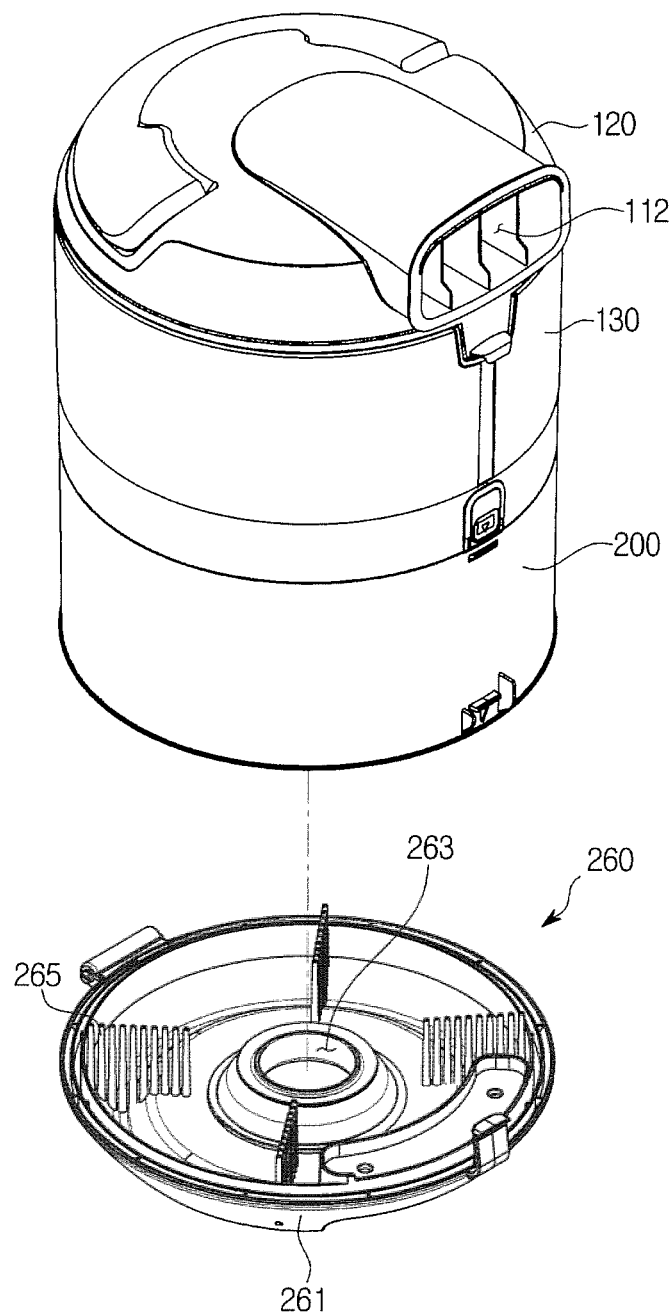

[Fig. 16]
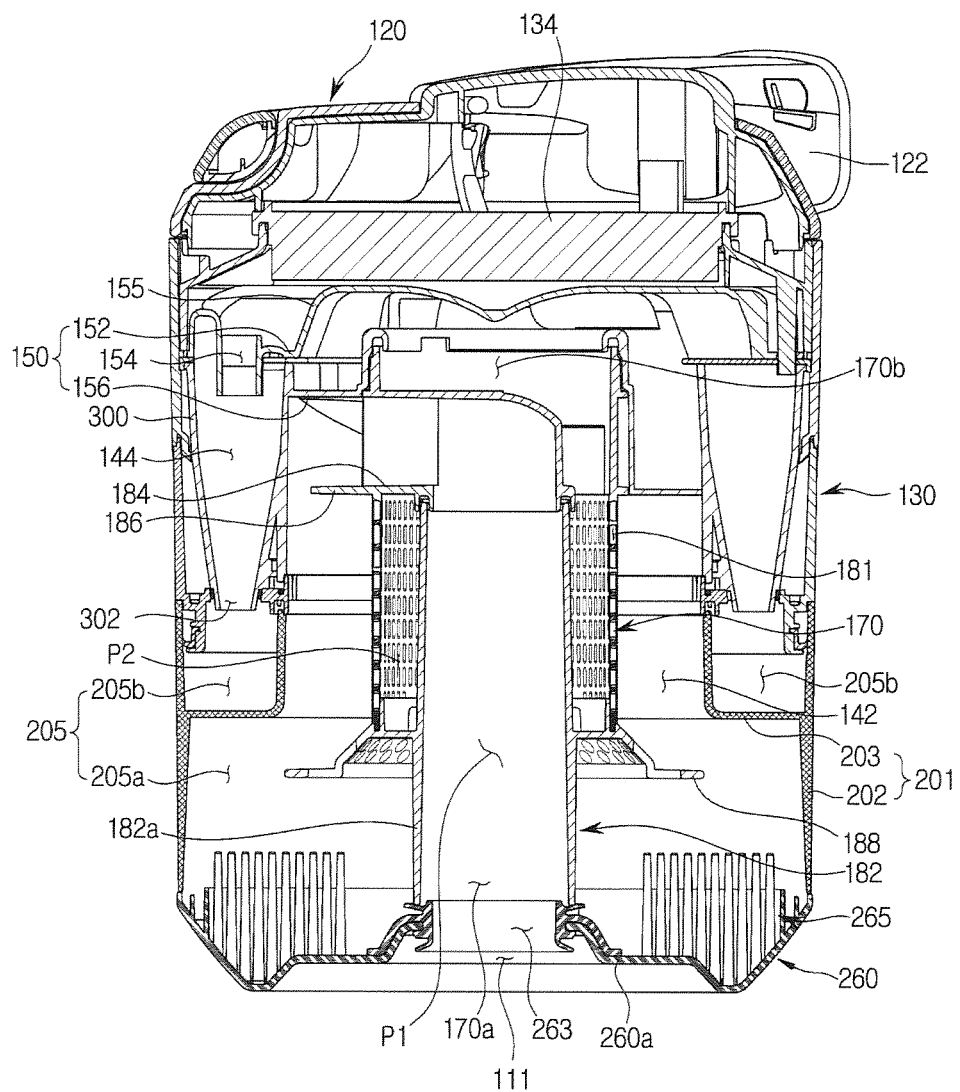

[Fig. 17]
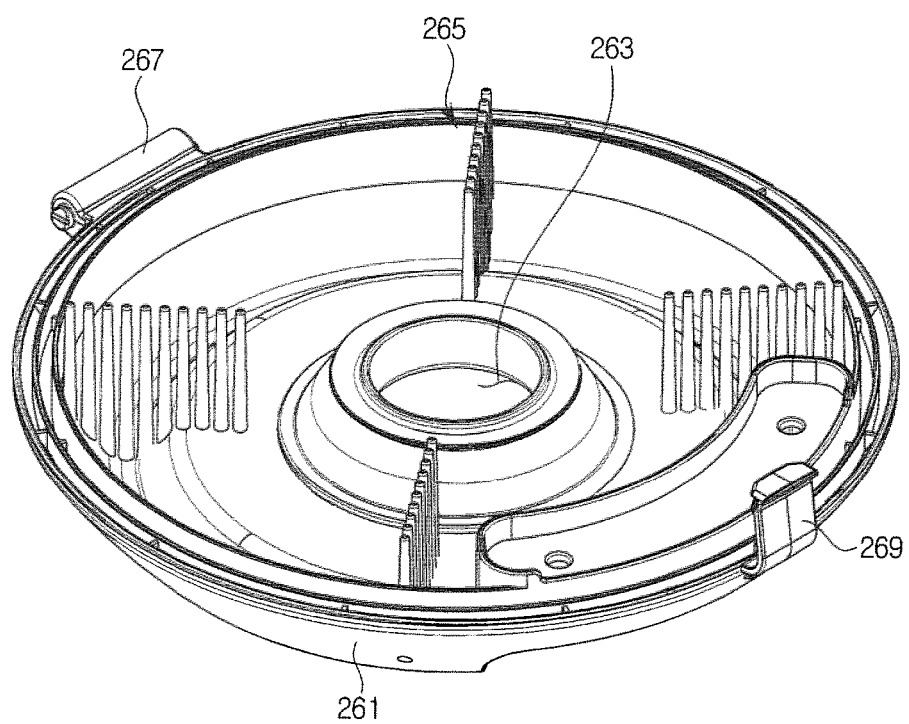

[Fig. 18]
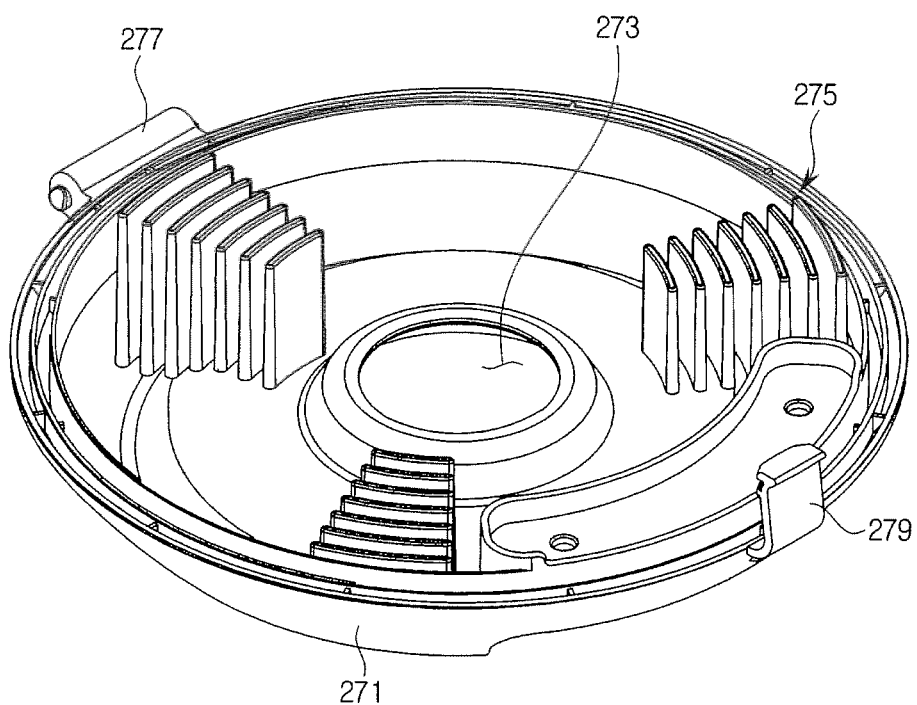

[Fig. 19]
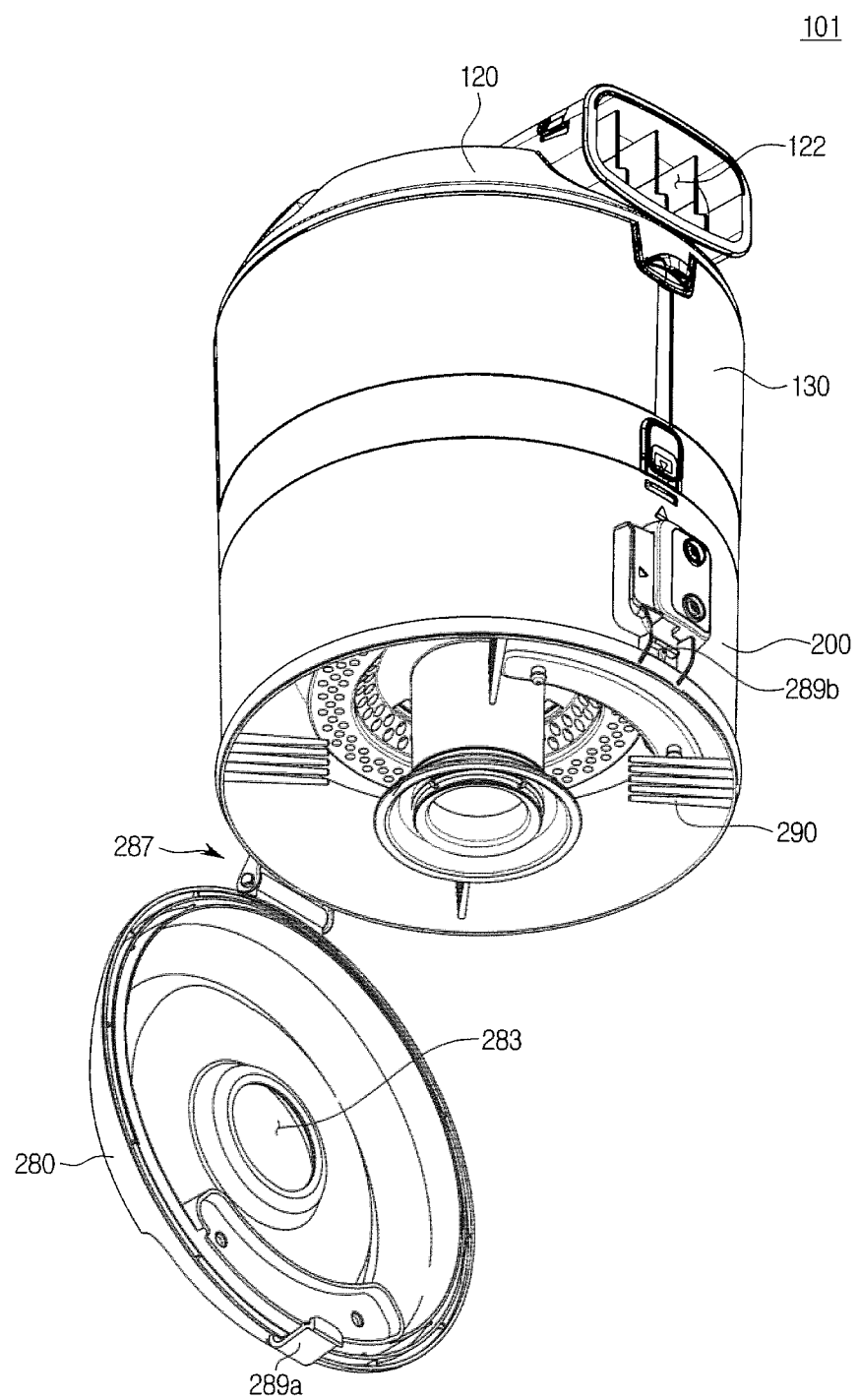

[Fig. 20]
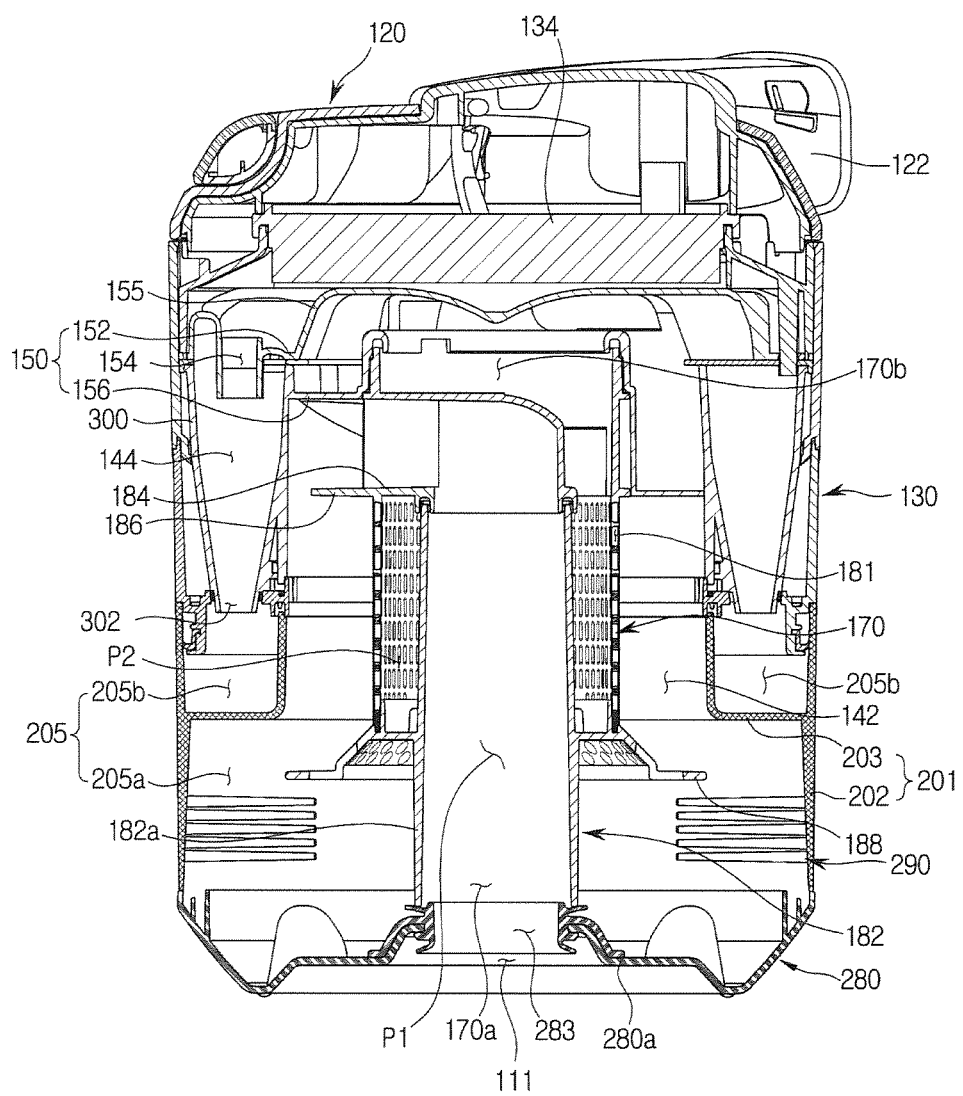

[Fig. 21]
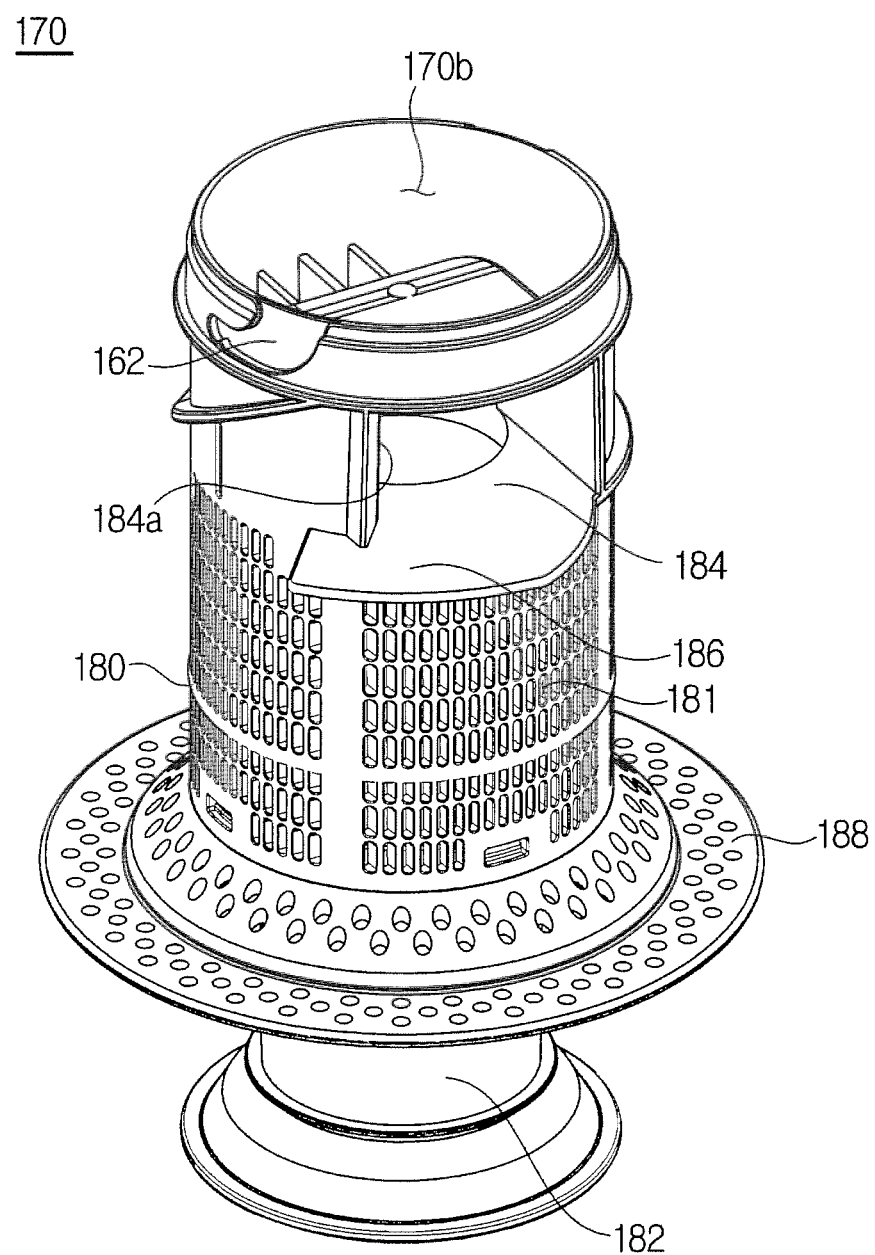

[Fig. 22]
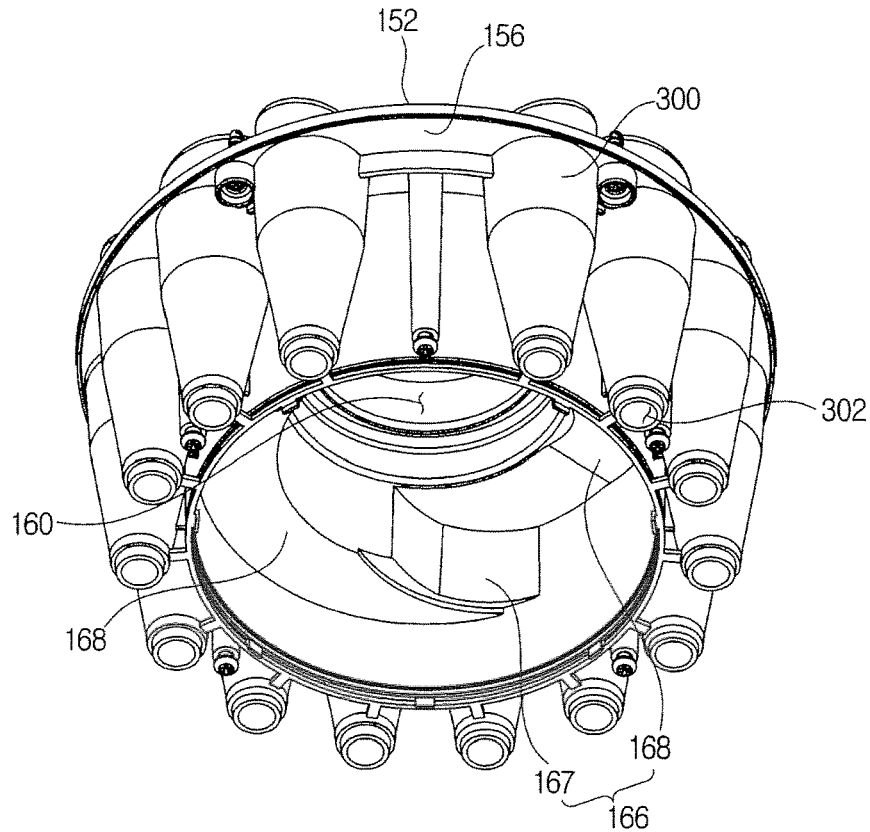
[Fig. 23]
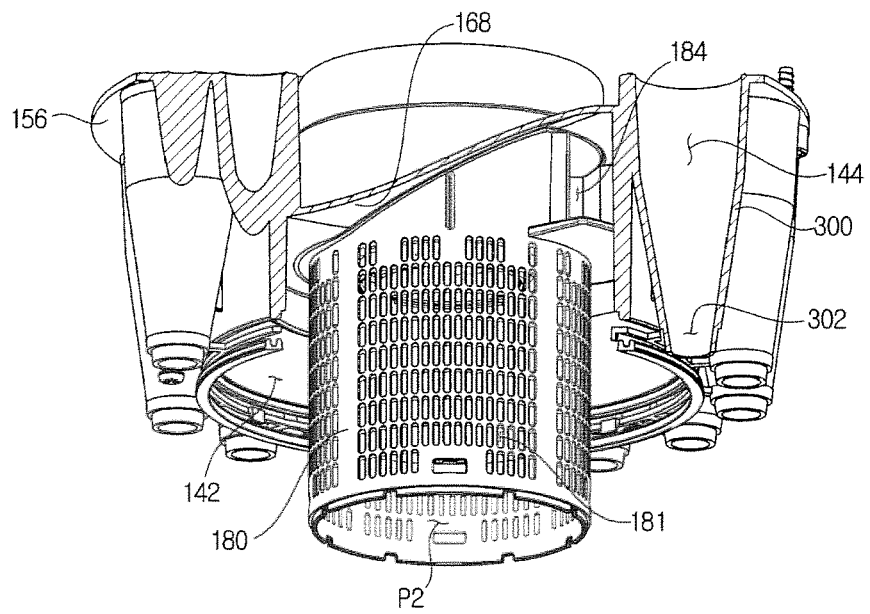

[Fig. 24]
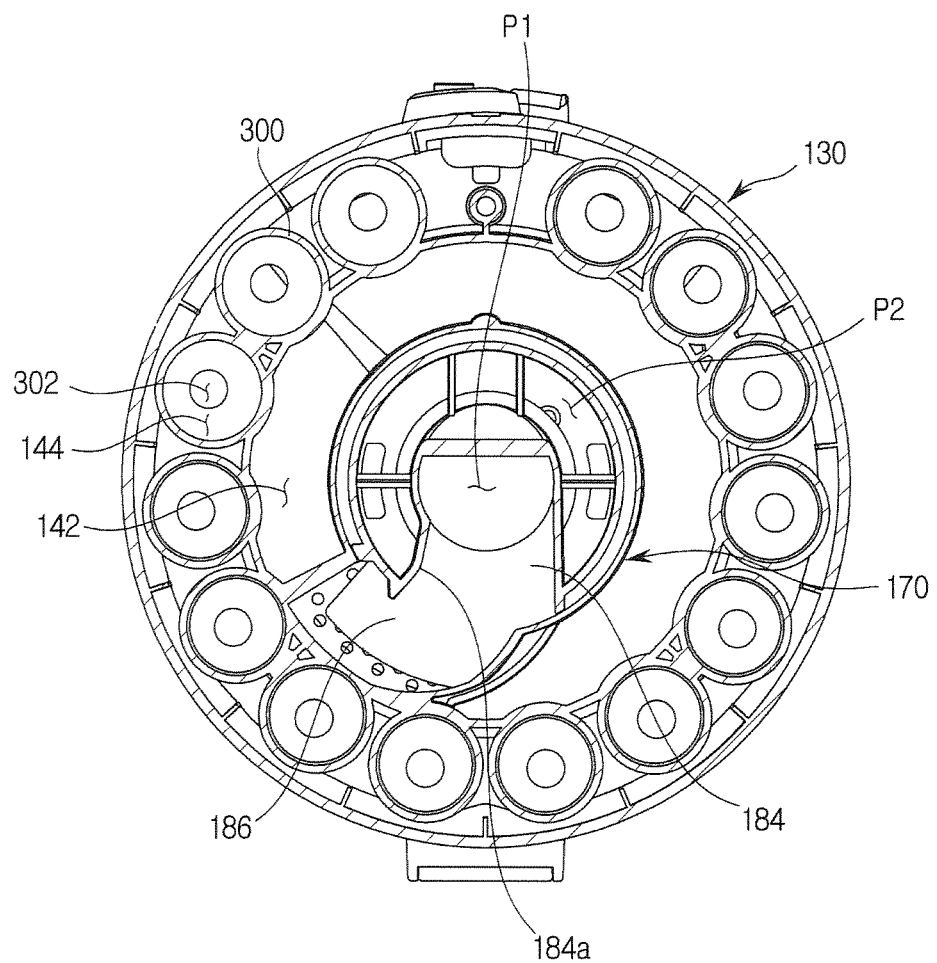

[Fig. 25]
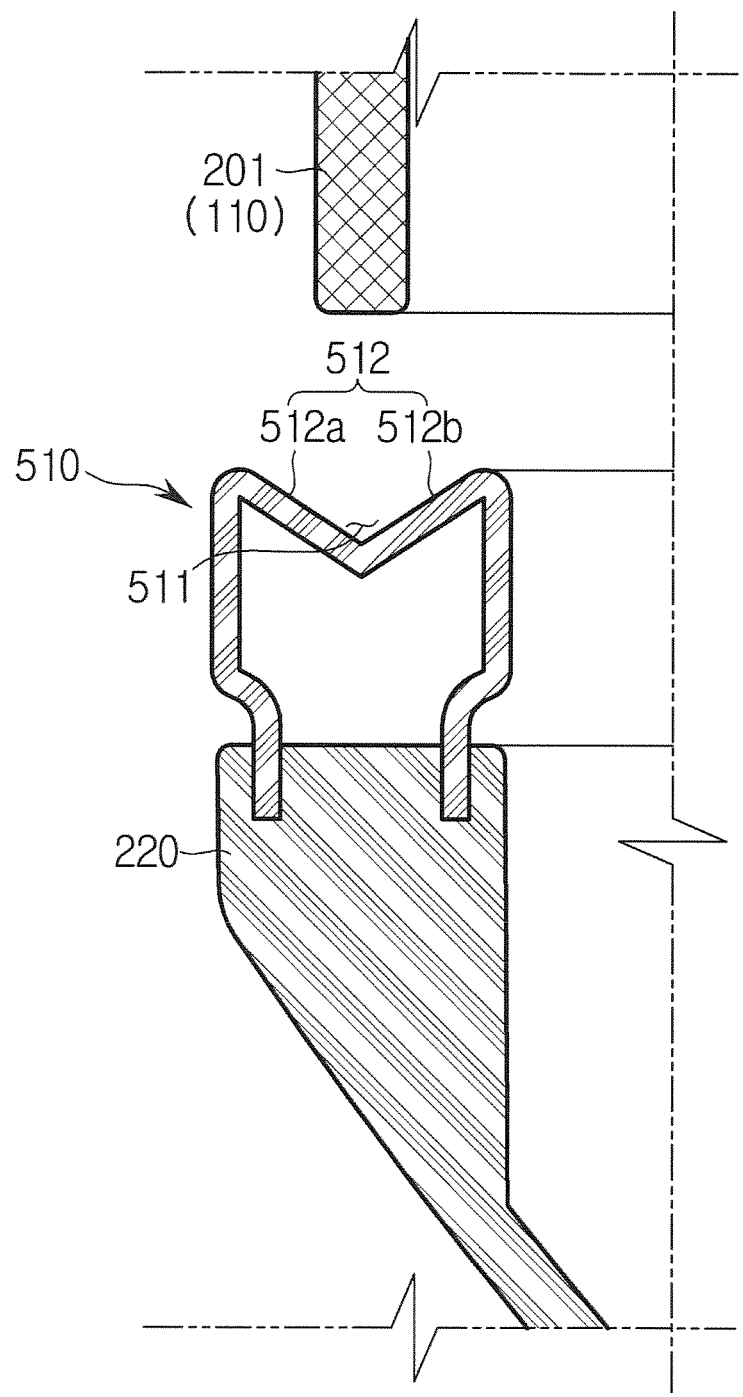

[Fig. 26]
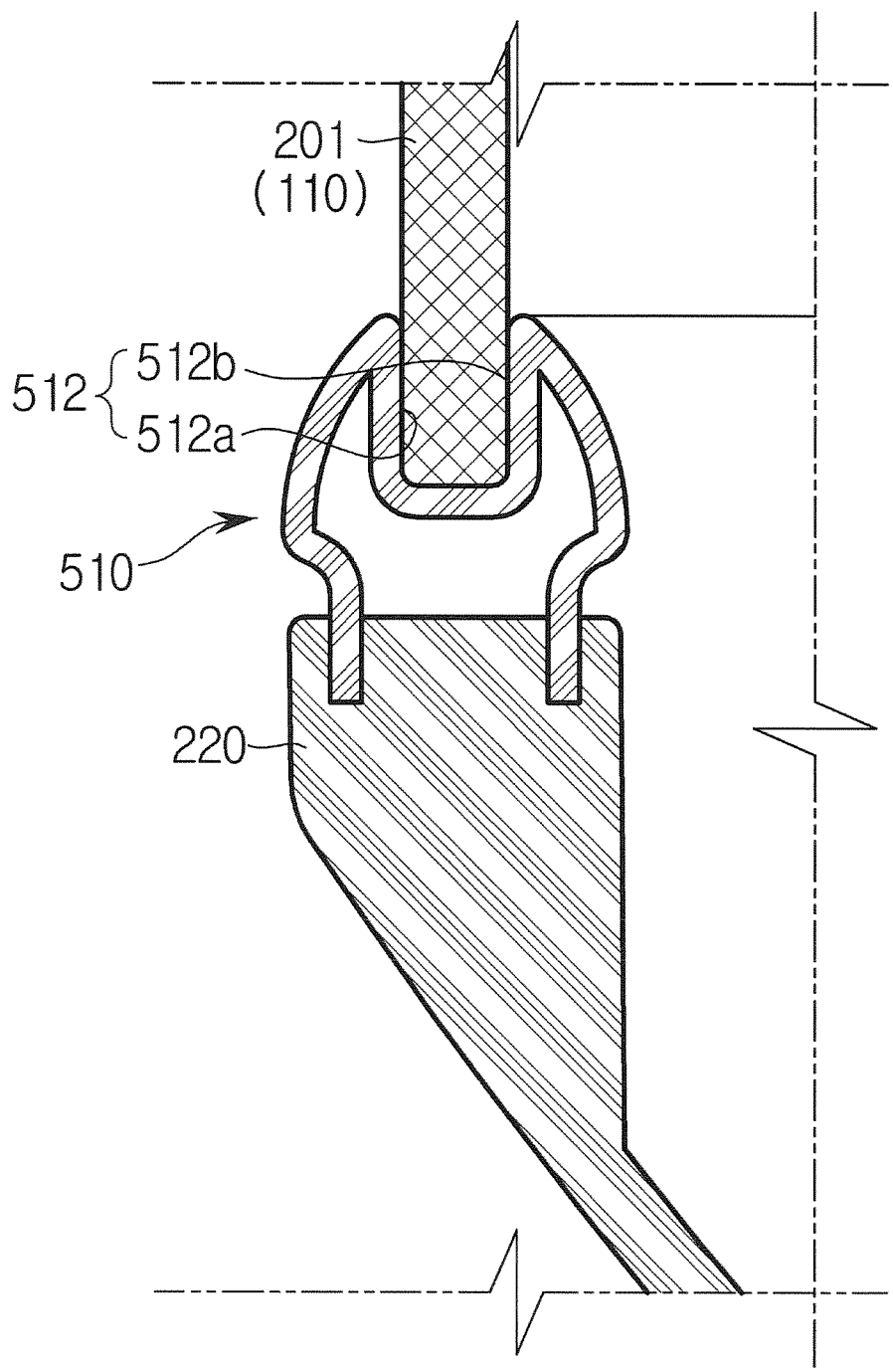

[Fig. 27]
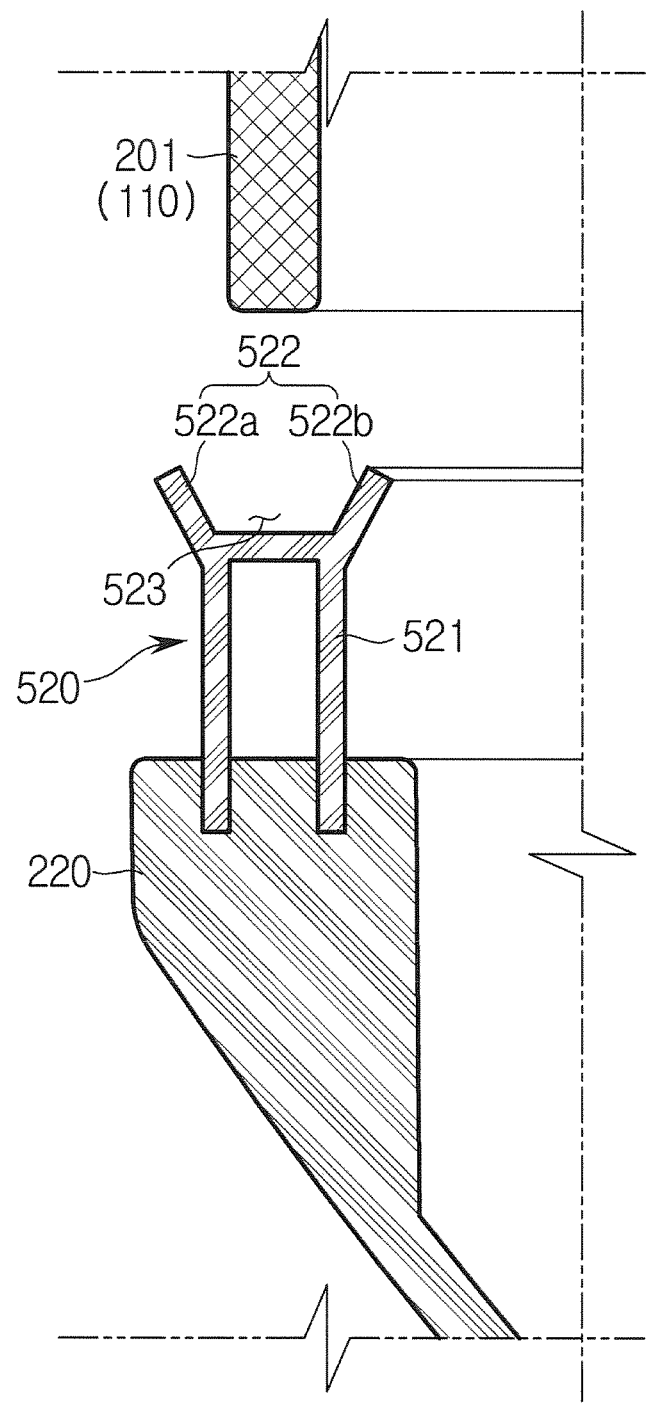

[Fig. 28]
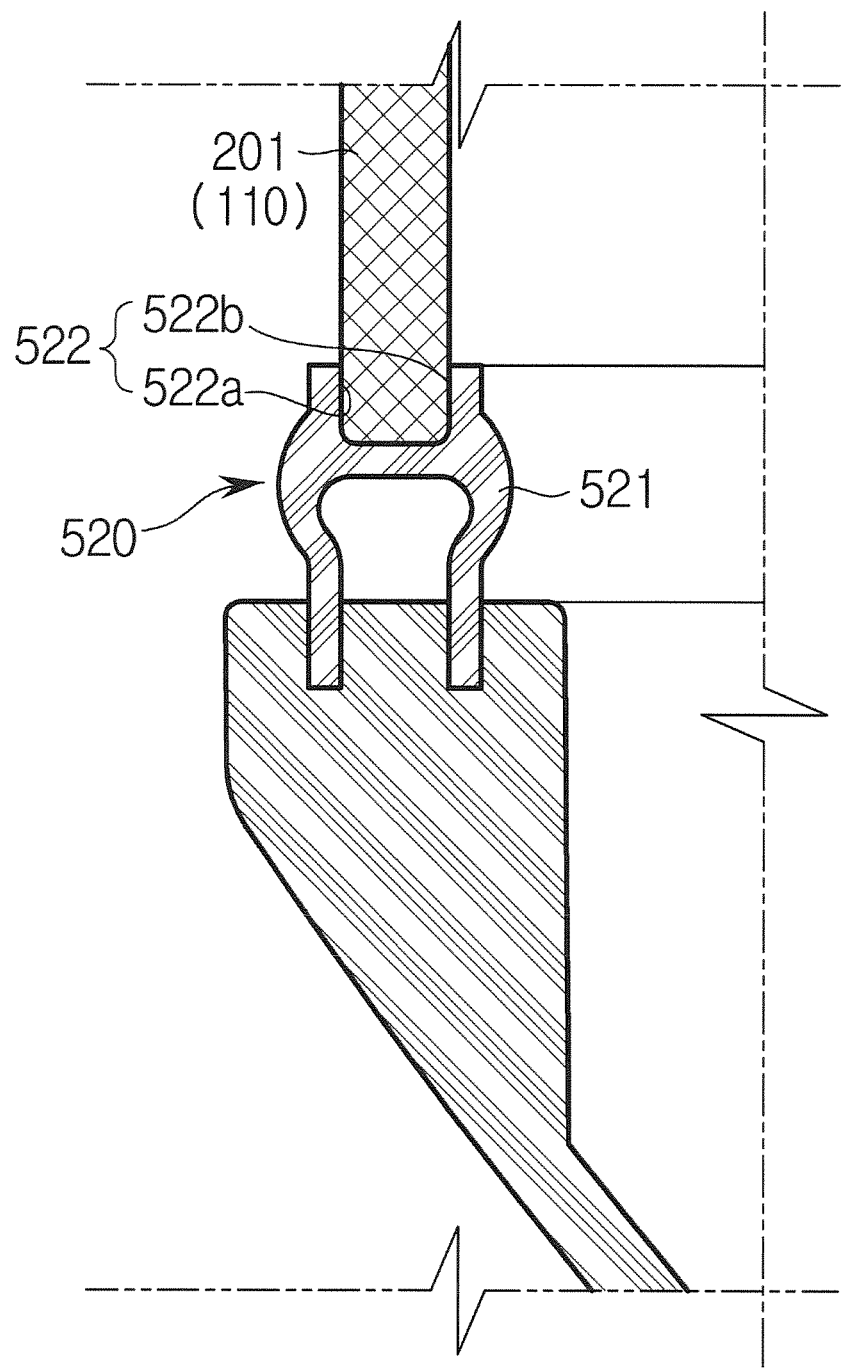

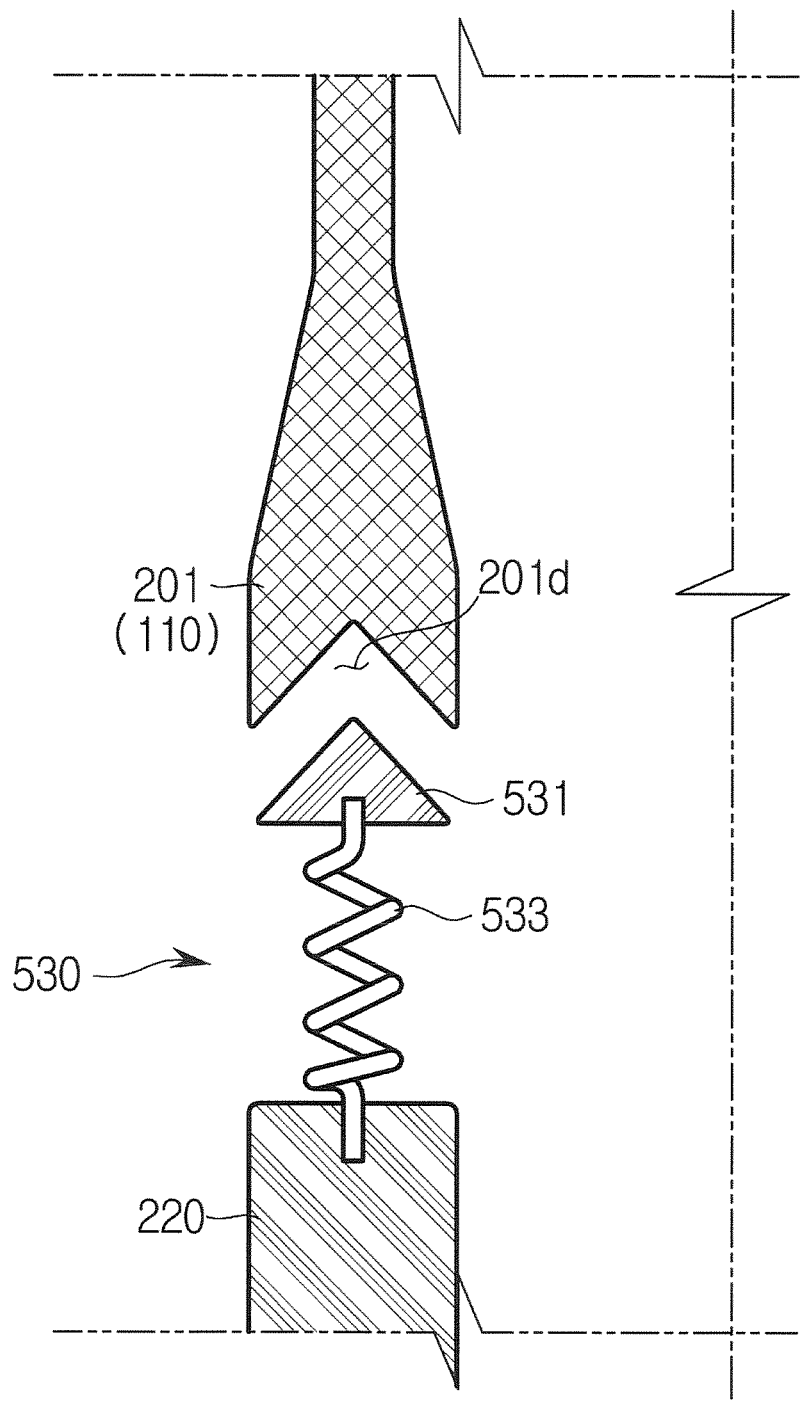
[Fig. 29]

[Fig. 30]
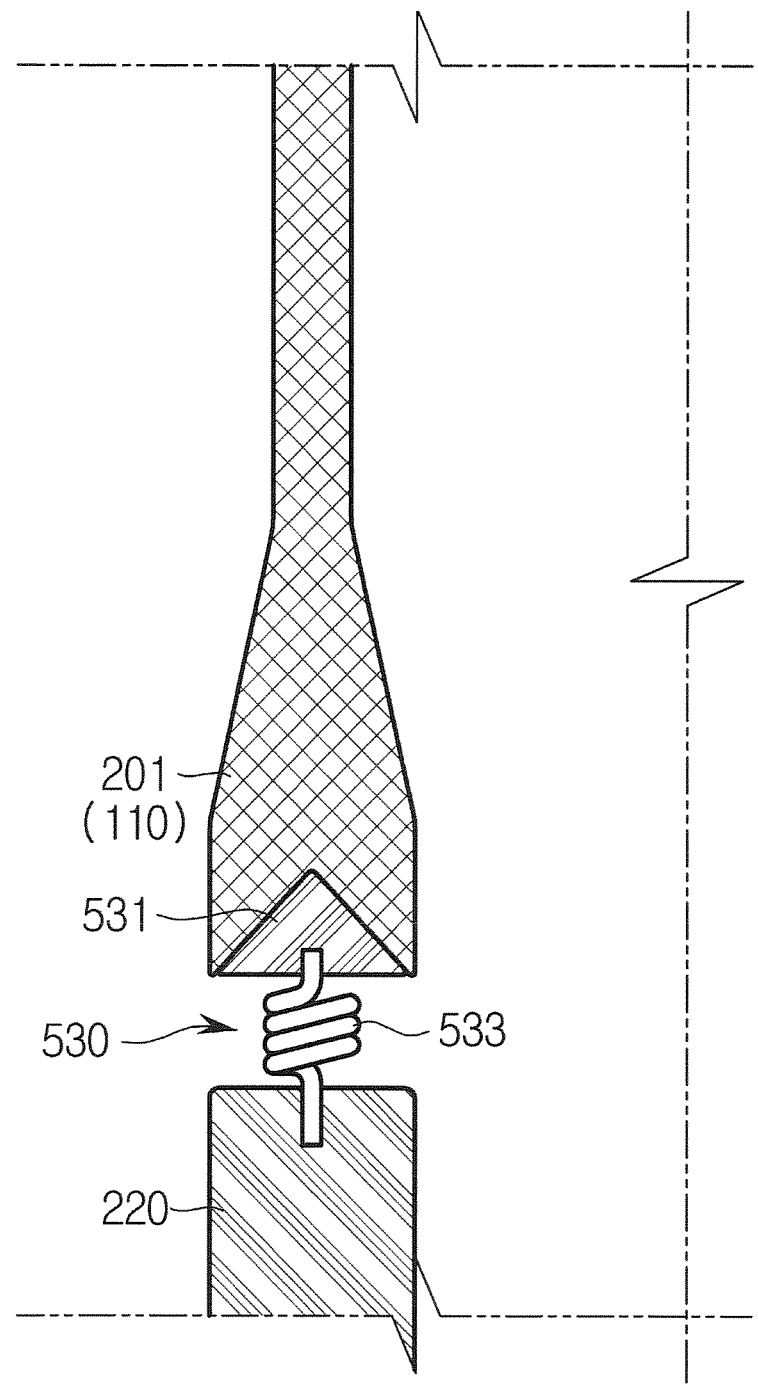

[Fig. 31]
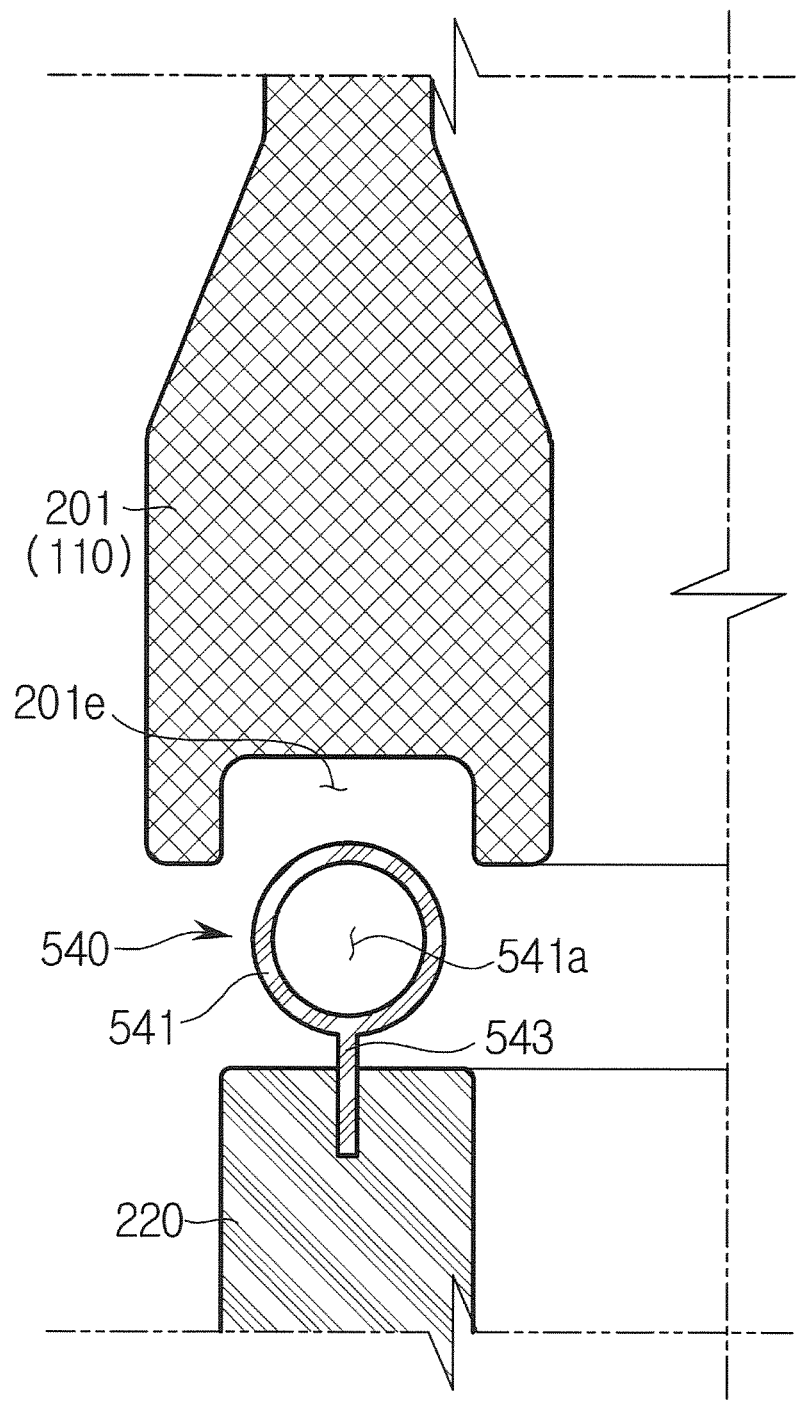

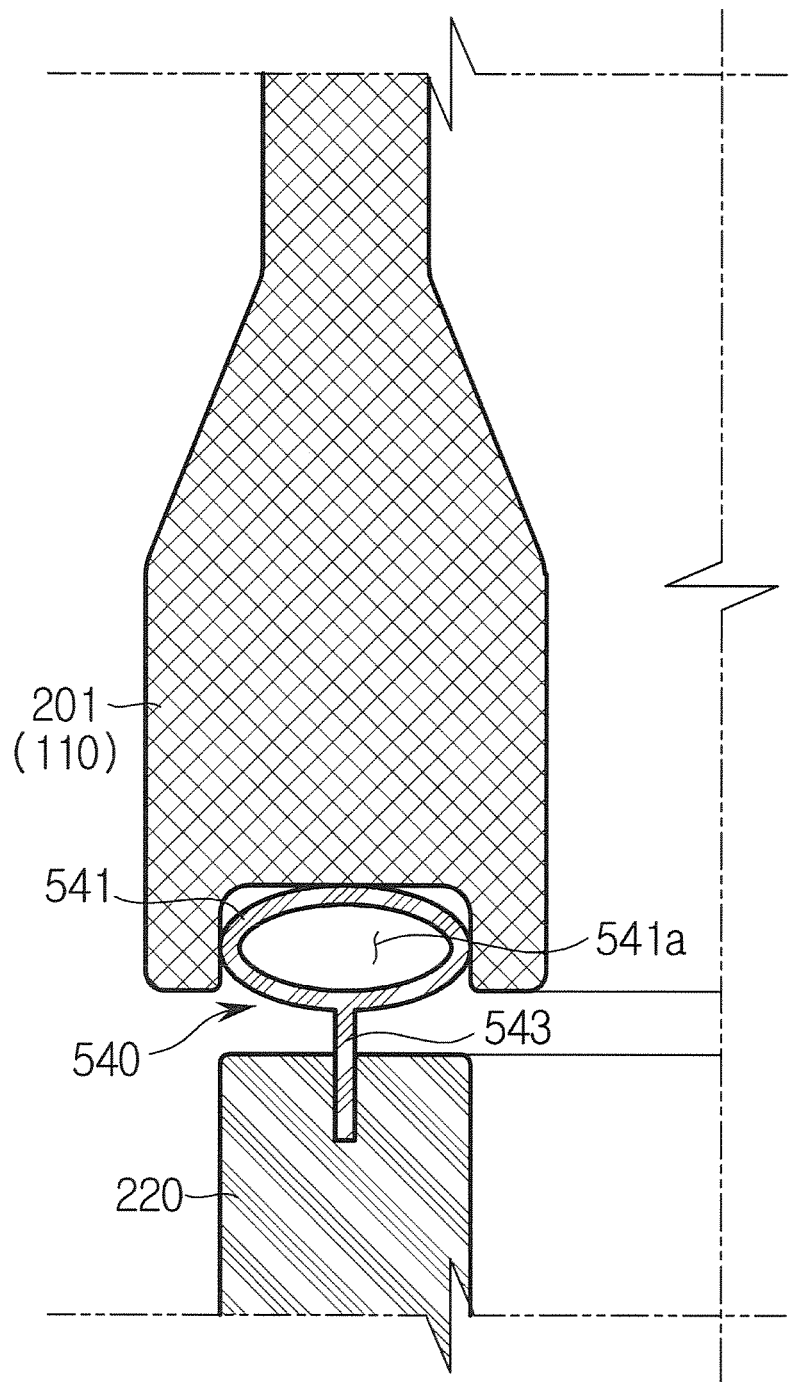
[Fig. 32]

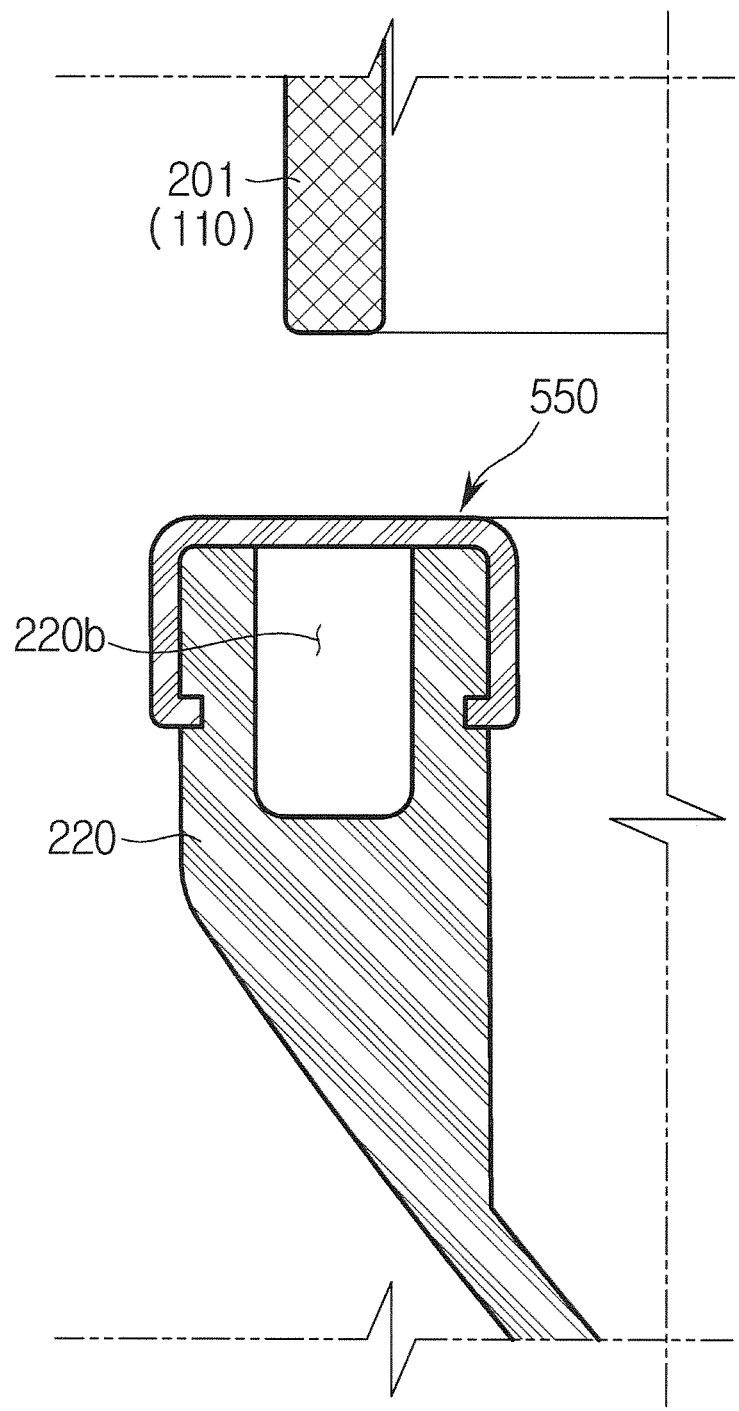
[Fig. 33]

[Fig. 34]
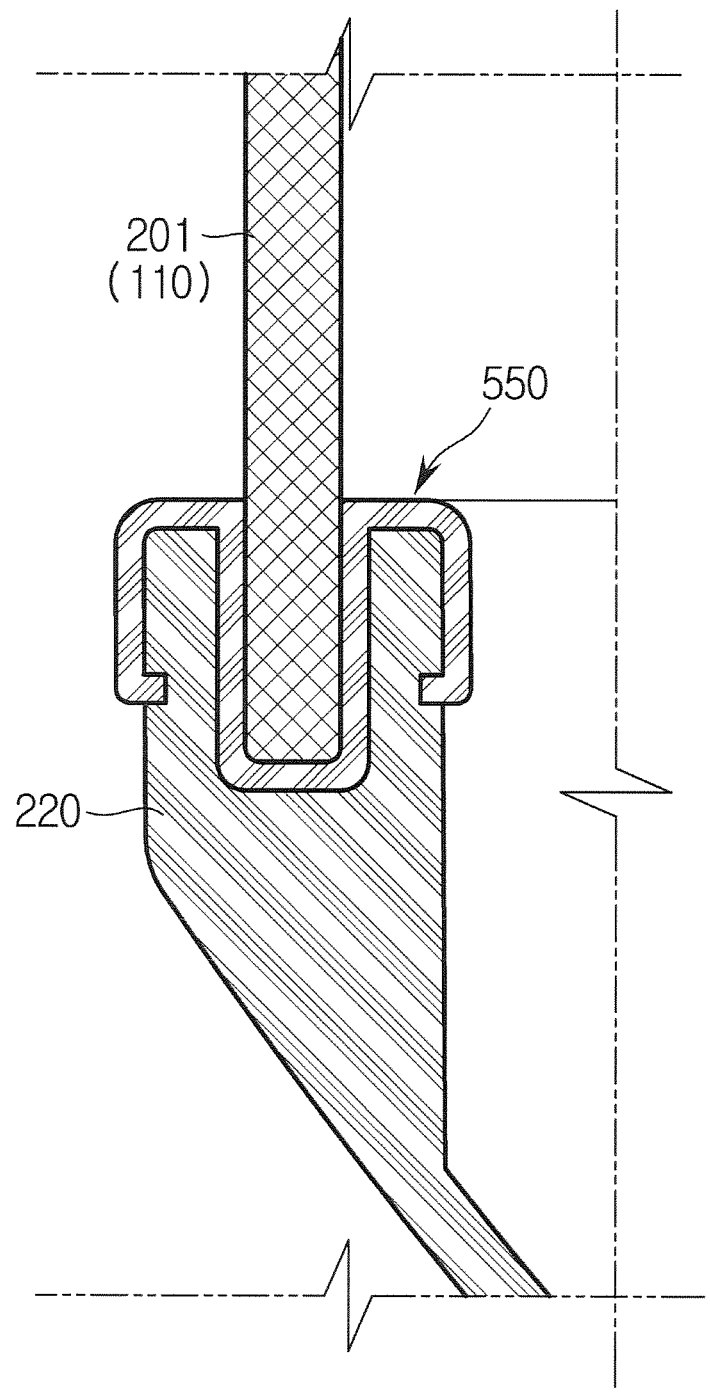

CLEANER AND DUST SEPARATING DEVICE APPLYING THE SAME

TECHNICAL FIELD

The present invention relates to a cleaner having an improved structure capable of preventing a leakage of dust and a breakdown in a dust collecting device which is opened and closed to separate the dust, and a dust collecting device applied to the same.

BACKGROUND ART

Generally, a cleaner is an apparatus in which air containing dirt on a surface to be cleaned is sucked, and the dirt is separated and collected from the air, and the cleaned air is discharged to an outside of a main body.

The cleaner is classified into a canister type in which a main body and a suction nozzle are separated and then connected with each other through a predetermined tube, and an up-right type in which the main body and the suction nozzle are formed as one body according to a type thereof.

The cleaner includes a driving unit which generates a suction force, a suction unit which sucks air on a surface to be cleaned using a suction force of the driving unit, and a dust collecting device which separates and collects dust from the air sucked by the suction unit and discharges the cleaned air.

Among dust collecting devices, a cyclone dust collecting device is a device which separates the dust in the sucked air using a centrifugal force. The cyclone dust collecting device may be semi-permanently used, and is sanitary and convenient, compared with a dust bag type dust collecting device, and thus used widely.

The cyclone dust collecting device may be used in various types such as the canister type, the up-right type, and a handy type, regardless of a shape or a kind of the cleaner.

The cyclone dust collecting device may include at least one cyclone. The at least one cyclone separates the dust from the air introduced into the cyclone dust collecting device using the centrifugal force. The cyclone generates a rotating air current therein, separates the dust from the air, moves the air from which the dust is separated to an outlet or another cyclone, and then secondarily separates the dust.

The cyclone dust collecting device is formed so that one side thereof is opened and closed to discharge the separated dust to an outside. At this time, an area to be opened and closed is sealed to maintain the suction force in the dust collecting device and also to prevent the dust from leaking to an outside. When a sealing member applied to the cyclone dust collecting device has an excellent sealing effect, the suction force in the dust collecting device is maintained and a leakage of the dust is reduced, but it is difficult to open and close the dust collecting device. On the other hand, when the sealing member is provided to easily open and close the dust collecting device, the dust may leak due to an external shock or the like.

DISCLOSURE OF INVENTION

Technical Problem

The present invention is directed to providing a cleaner having an improved structure capable of being sealed to prevent internal dust from leaking from a dust collecting device which is opened and closed, and a dust collecting device applied to the same.

Also, the present invention is directed to providing a cleaner having an improved structure capable of maintaining a sealing state in a dust collecting device even though an external shock is exerted, and a dust collecting device applied to the same.

Also, the present invention is directed to providing a cleaner having an improved structure capable of maintaining an excellent sealing state in a dust collecting device even though an external shock is exerted, and also being easily opened and closed, and a dust collecting device applied to the same.

Solution to Problem

One aspect of the present invention provides a cleaner including a dust collecting device for separating dust from air, wherein the dust collecting device includes a dust collecting case having a dust discharging port opened to discharge the collected dust; a discharge cover coupled to one side of the dust collecting case to open and close the dust discharge port; and a sealing member provided to extend from an inner surface of the dust collecting case to a coupling surface of the dust collecting case while being in contact with the dust collecting case and thus to be sealed when the dust discharging port is closed.

The sealing member may include a sealing portion provided to be in surface contact with the inner surface and the coupling surface; and a connection portion connected to the sealing portion and to vary a position of the sealing portion.

The sealing portion may include a first sealing portion configured to extend from the connection portion and provided to be in contact with an inner surface of the dust discharging port and thus to be sealed; and a second sealing portion configured to extend from one side of the first sealing portion and provided to be in contact with the coupling surface and thus to be sealed.

The first sealing portion is formed to have a first angle with respect to the second sealing portion, and the first angle may be smaller than 90°.

The sealing portion may further include a third sealing portion configured to extend from one side of the connection portion and provided to be in contact with the discharge cover at a lower portion of the first sealing portion and thus to be sealed.

The sealing member may further include a coupling portion configured to extend from one side of the connection portion and provided to be coupled to an inside of the discharge cover.

The coupling portion may be provided so that the sealing member is coupled to and separated from the discharge cover.

The sealing member may be formed of a material having a restoring force.

The sealing member may be configured so that the second sealing portion is located between the dust collecting case and the discharge cover while the dust collecting case and the discharge cover are coupled to each other, and at least a part of the second sealing portion is located at an outside of the discharge cover while the dust collecting case and the discharge cover are separated from each other.

Another aspect of the present invention provides a dust collecting device applied to a cleaner, the device includes a dust collecting case having a dust discharging port opened to discharge dust collected therein; a discharge cover coupled to one side of the dust collecting case to open and close the dust discharge port; and a sealing member installed along a surface in which the dust collecting case faces the discharge cover, wherein the sealing member extends from an inner surface of the dust collecting case to a coupling surface of the dust collecting case while being in contact with the dust collecting case, and seals the dust collecting case and the discharge cover.

The sealing member may include a sealing portion provided to be in surface contact with the inner surface of the dust discharging port and the coupling surface of the dust collecting case; and a connection portion which is connected so that the sealing portion is able to be moved to a first position and a second position.

In the sealing member, the sealing portion may be located at the first position while the dust collecting case and the discharge cover are separated from each other, and the sealing portion may be located at the second position to seal the dust collecting case and the discharge cover while dust collecting case and the discharge cover are coupled to each other.

The sealing portion may include a first sealing portion configured to extend from the connection portion and provided to be in contact with an inner surface of the dust discharging port and thus to be sealed; and a second sealing portion configured to extend from one side of the first sealing portion and provided to be in contact with the coupling surface and thus to be sealed.

The first sealing portion may be formed to have a first angle with respect to the second sealing portion, and the first angle may be smaller than 90°.

The sealing member may further include a coupling portion configured to extend from one side of the connection portion and provided to be coupled to an inside of the discharge cover.

The sealing portion may further include a third sealing portion configured to extend from one side of the connection portion and provided to be in contact with the discharge cover at a lower portion of the first sealing portion and thus to be sealed.

The sealing member may have a restoring force.

The sealing member may be configured to be in surface contact with the inner surface and the coupling surface while a shape thereof is deformed due to coupling between the dust collecting case and the discharge cover.

Still another aspect of the present invention provides a cleaner including a dust collecting device for separating dust from air, wherein the dust collecting device includes a dust collecting case having a dust discharging port opened to discharge the collected dust; a discharge cover coupled to one side of the dust collecting case to open and close the dust discharge port; and a sealing member configured to be in surface contact from a coupling surface of the dust collecting case to an inner surface of the dust collecting case and to seal the dust collecting case and the discharge cover, and the sealing member has a restoring force, and when the dust discharge port is switched from an opened state to a closed state, a shape of the sealing member is deformed to seal the dust collecting case and the discharge cover.

Advantageous Effects of Invention

According to one embodiment of the present invention, the dust collecting device has the improved structure, and thus the sealing state can be maintained even when the external shock is exerted.

According to one embodiment of the present invention, the dust collecting device can be easily opened and closed, and can have an improved sealing effect.

According to one embodiment of the present invention, the enhanced sealing effect can be provided by increasing a contact area between the sealing member and the dust collecting device.

BRIEF DESCRIPTION OF DRAWINGS

FIG. 1 is a view illustrating a cleaner according to one embodiment.

FIG. 2 is a view illustrating a state in which a dust collecting device is separated from a main body of the cleaner according to one embodiment.

FIG. 3 is an exploded perspective view illustrating the dust collecting device of the cleaner according to one embodiment.

FIG. 4 is a cross-sectional view illustrating a cross section of the dust collecting device of the cleaner according to one embodiment.

FIG. 5 is a view illustrating a state in which a discharge cover is opened in the dust collecting device of the cleaner according to one embodiment.

FIG. 6 is an exploded perspective view illustrating the discharge cover and a sealing member in the dust collecting device of the cleaner according to one embodiment.

FIG. 7 is a view enlargedly illustrating a cross section of the sealing member of FIG. 6.

FIG. 8 is a view illustrating a state in which the sealing member of FIG. 6 is located at a first position.

FIG. 9 is a view illustrating a state in which the sealing member of FIG. 6 is located at a second position.

FIG. 10 is a view illustrating a process in which the sealing member seals the discharge cover and a dust collecting case in the dust collecting device according to one embodiment of the present invention.

FIGS. 11 and 12 are views illustrating a first modified example of the sealing member of FIG. 7.

FIGS. 13 and 14 are views illustrating a second modified example of the sealing member of FIG. 7.

FIGS. 15 and 16 are views illustrating a third modified example of the sealing member of FIG. 7.

FIGS. 17 and 18 are views illustrating a fourth modified example of the sealing member of FIG. 7.

FIGS. 19 and 20 are views illustrating a fifth modified example of the sealing member of FIG. 7.

FIGS. 21 and 22 are views illustrating a sixth modified example of the sealing member of FIG. 7.

FIGS. 23 and 24 are views illustrating a seventh modified example of the sealing member of FIG. 7.

FIG. 25 is an exploded perspective view illustrating the dust collecting device including a dust catching member according to another embodiment of the present invention.

FIG. 26 is a cross-sectional view illustrating a cross section of the dust collecting device of FIG. 25.

FIG. 27 is a cross-sectional view illustrating a discharge cover including the dust catching member of FIG. 25.

FIG. 28 is a view illustrating the discharge cover including a first modified example of the dust catching member of FIG. 25.

FIG. 29 is a perspective view illustrating a dust collecting device including a second modified example of the dust catching member of FIG. 25.

FIG. 30 is a view illustrating a cross section of the dust collecting device of FIG. 29.

FIG. 31 is a perspective view illustrating a grill unit of FIG. 3.

FIG. 32 is a perspective view illustrating a cyclone body of FIG. 3.

FIG. 33 is a cut-away perspective view illustrating a coupling structure of the grill unit and the cyclone body of FIG. 3.

FIG. 34 is a view of the dust collecting device taken along a line A-A' of FIG. 4.

MODE FOR THE INVENTION

Hereinafter, exemplary embodiments of the present invention will be described in detail with reference to the accompanying drawings. Meanwhile, the terms such as "front end", "rear end", "upper", "lower", "upper end" and "lower end" used in the specification are defined based on the drawings, and a shape and a location of each element should not be limited by the terms.

FIG. 1 is a view illustrating a cleaner according to one embodiment, and FIG. 2 is a view illustrating a state in which a cyclone dust collecting device is separated from a main body of the cleaner according to one embodiment. Hereinafter, a dust collecting device 100 may be used as a meaning including the cyclone dust collecting device. Hereinafter, dirt may be used as a meaning embracing various foreign substances including dust.

As illustrated in FIGS. 1 and 2, the cleaner 1 may include a main body 10, the dust collecting device 100, a suction part 21, and a wheel assembly 50. The dust collecting device 100 and the wheel assembly 50 may be installed at the main body 10. In particular, the dust collecting device 100 may be removably installed at the main body 10. The suction part 21 may be in contact with a surface to be cleaned, and may suck foreign substances on the surface to be cleaned.

The main body 10 may include a fan motor (not shown) which generates a suction force. The suction part 21 may suck air on the surface to be cleaned and dust contained in the air by the suction force generated in the main body 10. The suction part 21 may be provided in a wide shape to be in close contact with the surface to be cleaned.

An extension tube 20, a handle tube 30, and a flexible hose 23 may be provided between the main body 10 and the suction part 21. The extension tube 20 may be formed of a resin material or a metallic material, and may connect the suction part 21 with the handle tube 30.

The handle tube 30 is provided to connect the extension tube 20 with the flexible hose 23. A handle part 31 and an operation part 32 may be provided at the handle tube 30. A user may grasp the handle part 31 and then may perform a cleaning operation. Also, the user may operate a button or the like provided at the operation part 32, and may operate a function of the cleaner, for example to turn on/off the cleaner 1 or adjust a suction intensity.

The flexible hose 23 connects the handle tube 30 with the main body 10. The flexible hose may be provided to have a flexible material, such that the handle tube 30 is freely moved.

All of the suction part 21, the extension tube 20, the handle tube 30 and the flexible hose 23 may be provided to be in communication with each other. The air sucked by the suction part 21 may pass in turn through the extension tube 20, the handle tube 30, and the flexible hose 23, and then may be introduced into the main body 10.

The main body 10 may have a first body port 10a which guides the sucked air to the dust collecting device 100, and a second body port 10b through which the air cleaned in the dust collecting device 100 is discharged. The second body port 10b may be in communication with a suction chamber (not shown) at which the fan motor (not shown) is provided.

The main body 10 may have an installation part 11 at which the dust collecting device 100 is installed. The dust collecting device 100 may be removably installed at the installation part 11. The dust collecting device 100 may allow the air cleaned by separating and collecting the dust from the air sucked through the suction part 21 to flow to the fan motor (not shown) through the second body port 10b.

The dust collecting device 100 separates the dust from the air using centrifugation. That is, the dust collecting device 100 generates a rotating air current and separates the dust from the air using a centrifugal force. When a predetermined amount of the dust is collected in the dust collecting device 100, the user may separate the dust collecting device 100 from the main body 10, and then may throw away the dust collected in the dust collecting device 100.

FIG. 3 is an exploded perspective view illustrating the dust collecting device of the cleaner according to one embodiment, FIG. 4 is a cross-sectional view illustrating a cross section of the dust collecting device of the cleaner according to one embodiment, FIG. 5 is a view illustrating a state in which a discharge cover is opened in the dust collecting device of the cleaner according to one embodiment, and FIG. 6 is an exploded perspective view illustrating the discharge cover and a sealing member in the dust collecting device of the cleaner according to one embodiment.

As illustrated in FIGS. 3 to 6, the dust collecting device 100 according to one embodiment of the present invention may include a dust collecting case 110, a discharge cover 220, and a sealing member 230.

The dust collecting case 110 is coupled to the main body 10, and serves to collect dirt such as the dust in the air. The dust collecting case 110 may be provided to be coupled to the main body 10, to filter the dirt from the sucked air, and to discharge the air from which the dirt is filtered.

The dust collecting case 110 may include a suction port 220a and a discharge port 122. The air sucked through the suction part 21 is introduced into the dust collecting case 110 through the suction port 220a, and is separated from the dust in the dust collecting case 110. The air from which the dust is separated is discharged to the main body 10 through the discharge port 122. Specifically, the air discharged from the dust collecting case 110 through the discharge port 122 flows to the suction chamber (not shown) through the second body port 10b.

The dust collecting case 110 may include an inlet 111 through which the air is introduced, and an outlet 112 through which the air is discharged. In other words, the dust collecting case 110 may include the inlet 111 through which the air containing the dirt, i.e., the contaminated air is introduced, and the outlet 112 through which the air from which the dirt is removed, i.e., the cleaned air is discharged. The inlet 111 may be provided at the suction port 220a, and the outlet 112 may be provided at the discharge port 122.

The dust collecting case 110 may form an exterior of the dust collecting device 100. A part of the dust collecting case 110 may be formed of a transparent material to allow an internal space to be seen. The dust collecting case 110 may have a cylindrical shape, but the present invention is not limited thereto.

The dust collecting case 110 may include an upper case 120, a middle case 130, and a dust collecting container 200.

The middle case 130 may be formed in an approximately cylindrical shape of which upper and lower surfaces are opened. A filter member 134 may be provided at an upper portion of the middle case 130 to remove the dirt remaining in the air passing through cyclone chambers 142 and 144.

The filter member 134 may be provided at an upper opening 132 formed at the upper portion of the middle case 130. That is, the filter member 134 may be provided at the upper opening 132 of the middle case 130 to remove the dirt remaining in the air passing through the first and second cyclone chambers 142 and 144.

The upper case 120 may be provided on the middle case 130. The upper case 120 may be hinge-coupled to a hinge portion 136 provided at the middle case 130, and thus may be pivotably provided. The discharge port 122 through which the air cleaned while passing through the cyclone chambers 142 and 144 and the filter member 134 is discharged may be provided at the upper case 120. The discharge port 122 may be in communication with the suction chamber (not shown) located in the main body 10 at which the fan motor (not shown) is provided.

The dust collecting container 200 may be disposed to accommodate the dust separated from the air and to be in communication with at least one cyclone 300. Also, the dust collecting container 200 may be provided under the middle case 130 to collect the dirt contained in the air.

The dust collecting container 200 may include a container body 201, and a dust collecting chamber 205 which is provided in the container body 201 to accommodate the dirt.

The dust collecting chamber 205 may include a first dust collecting chamber 205a and a second dust collecting chamber 205b. The first dust collecting chamber 205a may be provided to correspond to the first cyclone chamber 142, and the second dust collecting chamber 205b may be provided to correspond to the second cyclone chamber 144. That is, the dust discharged from the first cyclone chamber 142 may be collected in the first dust collecting chamber 205a, and the dust discharged from the second cyclone chamber 144 may be collected in the second dust collecting chamber 205b. Since the second cyclone chamber 144 is disposed along a circumference of the first cyclone chamber 142 in a circumferential direction, the second dust collecting chamber 205b may be provided to correspond to the second cyclone chamber 144 in the circumferential direction with respect to the first dust collecting chamber 205a. That is, the second dust collecting chamber 205b may be provided in an annular shape, and at least a part of the second dust collecting chamber 205b may be formed at an upper portion of the first dust collecting chamber 205a along a circumference thereof.

The second dust collecting chamber 205b may include a discharge chamber 205c. The discharge chamber 205c may be provided to collect the dirt accumulated in the second dust collecting chamber 205b. The discharge chamber 205c may be provided at a deep section of the second dust collecting chamber 205b.

The dust collecting chamber 205 may have a dust discharging port 205d which is opened at one side thereof to discharge the collected dirt or the like to an outside. The dust discharging port 205d may be provided to be opened and closed by the discharge cover 220.

The container body 201 may include a container outer wall 202 and a container inner wall 203. The container outer wall 202 may be provided to have a cylindrical shape of which upper and lower portions are opened, and the container inner wall 203 may have a flange shape which extends inward to have an annular space at an inner upper portion of the container outer wall 202. The first dust collecting chamber 205a may be provided to be surrounded by an inside of the container outer wall 202, an inside of the container inner wall 203, and the discharge cover 220. The second dust collecting chamber 205b may be provided to be surrounded by the inside of the container outer wall 202, an outside of the container inner wall 203, and the discharge cover 220.

At least a part of the dust collecting container 200 may be formed of a transparent material to allow the dust collecting chamber 205 to be seen from an outside.

The discharge cover 220 may be coupled to one side of the dust collecting case 110 to open and close the dust discharging port 205d. The discharge cover 220 may be hinge-coupled to one side of the dust collecting case 110. The discharge cover 220 may be pivoted about a hinge 227, and may open and close the dust discharging port 205d.

The discharge cover 220 may further include a fixing member 229 which fixes the discharge cover 220 in a state coupled with the dust collecting case 110. The fixing member 229 may include a first fixing member 229a which is provided at one side of the discharge cover 220, and a second fixing member 229b which is installed at a position of the dust collecting container 200 corresponding to the first fixing member 229a. The first fixing member 229a and the second fixing member 229b may be provided to be coupled to each other, such that the discharge cover is fixed and coupled to the dust collecting container 200.

The suction port 220a may be provided at the discharge cover 220. The suction port 220a may be provided so that the air introduced from the flexible hose 23 is introduced into the dust collecting device 100. The suction port 220a may be provided to be in communication with an inlet tube 173. The suction port 220a may be provided at the discharge cover 220 so that the air sucked from the suction part 21 is not introduced by detouring through a side surface of the dust collecting case 110, but introduced through a lower portion of the dust collecting case 110. The inlet 111 may be provided at the suction port 220a. The inlet 111 may be disposed at a center of the suction port 220a, but the present invention is not limited thereto.

Hereinafter, the sealing member 230 according to one embodiment of the present invention will be described. The sealing member 230 seals the discharge cover 220 and the dust collecting case 110, and thus may prevent the dust in the dust collecting device 100 from leaking to the outside, and also may constantly maintain an internal pressure of the dust collecting device 100.

FIG. 7 is a view enlargedly illustrating a cross section of the sealing member of FIG. 6, FIG. 8 is a view illustrating a state in which the sealing member of FIG. 6 is located at a first position, and FIG. 9 is a view illustrating a state in which the sealing member of FIG. 6 is located at a second position.

Referring to FIGS. 7 to 9, the sealing member 230 may include a sealing portion 231 and a connection portion 235. When the dust discharging port 205d is closed, the sealing member 230 may be provided to extend to a coupling surface 201b while being in contact with an inner surface 201a of the dust collecting case 110, and thus to provide a sealing effect. The sealing member 230 may be installed along a surface in which the dust collecting case 110 faces the discharge cover 220.

The sealing portion 231 may be provided to be in contact with each of the discharge cover 220 and the container body 201 of the dust collecting case 110, and thus to provide the sealing effect. Hereinafter, the dust collecting case 110 which is in contact with the sealing portion 231 may be used as a meaning including the container body 201 in contact with the sealing portion 231.

The sealing portion 231 may include a first sealing portion 232 and a second sealing portion 233.

The first sealing portion 232 may be provided to extend from a connection portion 235. The first sealing portion 232 may be provided to be in contact with the inner surface 201a of the dust collecting case facing the dust discharging port 205d, and thus to provide the sealing effect. The first sealing portion 232 may be provided so that a position thereof is varied when the dust discharging port 205d is opened and closed by the discharge cover 220.

The second sealing portion 233 may be provided to extend from the first sealing portion 232. The second sealing portion 233 may be formed to have a first angle α with respect to the second sealing portion 233. According to an example, the first angle α may be smaller than 90°. Since the sealing portion 231 is formed of a material having elasticity, when the first angle α is 90° or more, a restoring force may be generated at the first and second sealing portions 232 and 233. Therefore, the dust collecting case 110 may be effectively sealed between the first and second sealing portions 232 and 233. On the other hand, the first angle α is greater than 90°, such that the dust collecting case 110 is easily in contact with the first and second sealing portions 232 and 233.

The second sealing portion 233 may be provided to be in contact with the coupling surface 201b of the dust collecting case facing the discharge cover 220 and thus to provide the sealing effect. The second sealing portion 233 may be provided together with the first sealing portion 232 so that a position thereof is varied when the dust discharging port 205d is opened and closed by the discharge cover 220.

The sealing portion 231 may further include a third sealing portion 234. The third sealing portion 234 may be formed by extending from one side of the connection portion 235. The third sealing portion 234 may be located to be spaced from the first and second sealing portions 232 and 233. The third sealing portion 234 may be provided so that one side surface thereof is in contact with a coupling surface 227 of the discharge cover 220 facing the coupling surface 201b of the dust collecting case, and thus may provide the sealing effect.

The connection portion 235 may be provided to be connected to one side of the sealing portion 232. The connection portion 235 may be provided so that a position thereof is varied. Therefore, the connection portion 235 may vary a position of the sealing portion 232.

The connection portion 235 may include a material having the elasticity. Therefore, when an external force is applied, the position of the connection portion 235 may be moved, and when the external force is removed, the connection portion 235 may be returned to its original position. The entire sealing member 230 including the connection portion 235 may be formed of the material having the elasticity.

The connection portion 235 may be provided to have a shape which is rounded to an inside of the dust collecting device. Therefore, the connection portion 235 may easily move the positions of the first and second sealing portions 232 and 233.

A coupling portion 236 may be provided to extend from one side of the connection portion 235. The coupling portion 236 may be provided to be coupled to one side of the discharge cover 220. The coupling portion 236 may be coupled into a fixing groove 225 provided at the discharge cover 220. The fixing groove 225 may be provided at an inner edge area of the discharge cover 220. The fixing groove 225 may be provided at a position which is spaced inward from the coupling surface 227 of the discharge cover 220. The fixing groove 225 may be provided so that the coupling portion 236 is inserted into a space 225c between protruding portions 225a and 225b which protrude upward to have a predetermined distance at an inside of the discharge cover 220. Therefore, the coupling portion 236 may fix the sealing member 230 to the discharge cover 220.

The coupling portion 236 may be provided to be coupled to and separated from the discharge cover 220. Therefore, the sealing member 230 may be provided to be coupled to and separated from the discharge cover 220.

As illustrated in FIGS. 8 and 9, the sealing member 230 may be provided to be movable to first and second positions. As illustrated in FIG. 8, when the discharge cover 220 is separated from the dust collecting case 110, the sealing member 230 may be provided at the first position. The first position may be defined as a position in a state in which the external force is not applied. The sealing member 230 may be provided so that at least a part thereof is located at an outside of the discharge cover 220 at the first position. The sealing member 230 may be provided so that a part of the first sealing portion 232 or the second sealing portion 233 is located at the outside of the discharge cover 220 at the first position. The first and second sealing portions 232 and 233 may be located to be spaced a predetermined distance from the third sealing portion 234.

As illustrated in FIG. 9, when the discharge cover 220 is coupled to the dust collecting case 110, the sealing member 230 may be provided at the second position. The second position may be defined as a position at which the sealing member 230 is in contact with the dust collecting case 110 and provides the sealing effect. The sealing member 230 at the second position may be located to be further moved to the inside of the discharge cover 220 than at the first position.

The sealing member 230 at the second position may be located so that the first and second sealing portions 232 and 233 are in contact with the inner surface 201a of the dust collecting case and the coupling surface 201b of the dust collecting case, respectively. The sealing member 230 has the elasticity at the second position, and thus may have a restoring force intended to be returned to the first position. Therefore, the sealing member 230 may enhance the inner surface 201a of the dust collecting case and the coupling surface 201b of the dust collecting case due to the restoring force generated at the second position. The sealing member 230 may be provided so that the second sealing portion 233 is in contact with the third sealing portion 234 at the second position.

The third sealing portion 234 may be provided at a fixed position. The third sealing portion 234 may be located to be in contact with the coupling surface 227 of the discharge cover 220, and may seal the discharge cover 220. The third sealing portion 234 may be located to be spaced from the second sealing portion 233, when the sealing member 230 is located at the first position, and may also be located to be in contact with the second sealing portion 233, when the sealing member 230 is located at the second position.

As described above, a shape of the sealing member 230 may be configured to be in surface contact with the inner surface 201a and the coupling surface 201b, while a shape thereof is deformed by coupling of the dust collecting case 110 and the discharge cover 220. When the dust discharging port 205d is switched from an opened state to a closed state, the sealing member 230 is deformed and thus may seal the dust collecting case 110 and the discharge cover 220.

Hereinafter, a process in which the sealing member according to one embodiment of the present invention seals the discharge cover and the dust collecting case will be described.

FIG. 10 is a view illustrating the process in which the sealing member seals the discharge cover and the dust collecting case in the dust collecting device according to one embodiment of the present invention.

Referring to FIG. 10, FIG. 10A is a view illustrating a state in which the sealing member is provided at the first position, FIG. 10B is a view illustrating a state in which the sealing member is moved and a position thereof is moved while being in contact with the dust collecting case, and FIG. 10C is a view illustrating a state in which the discharge cover is coupled to the dust collecting case and the sealing member is provided at the second position.

As illustrated in FIG. 10A, when the user moves the discharge cover 220 to close the opened dust discharging port 205d, the sealing member 230 may be moved toward the dust collecting case 110 together with the discharge cover 220. At this time, the first sealing portion 232 and the second sealing portion 233 may be located to be spaced from the third sealing portion 234.

When the sealing member 230 is moved to a position adjacent to the dust collecting case 110, the sealing member 230 may be located at a position in which at least a part of the first sealing portion 232 or the second sealing portion 233 faces the coupling surface 201b of the dust collecting case 110.

As illustrated in FIG. 10B, the sealing member 230 may be moved together with the discharge cover 220 until being in contact with a part of the dust collecting case 110. The sealing member 230 may be moved until the coupling surface 201b of the dust collecting case 110 is in contact with at least a part of the first sealing portion 232 or the second sealing portion 233. In this state, as the discharge cover 220 is closer to the dust collecting case 110, the first sealing portion 232 becomes closer to the third sealing portion 234, and the second sealing portion 233 may be moved together with the connection portion 235 toward the inside of the discharge cover 220.

As illustrated in FIG. 10C, when the discharge cover 220 blocks the dust discharging port 205d and is coupled to the dust collecting case 110, the sealing member 230 may be provided to seal each of the discharge cover 220 and the dust collecting case 110. At this time, the sealing member 230 may be moved to the second position while being in contact with the dust collecting case 110. At the second position, the sealing member 230 may perform a sealing operation in a state in which the first sealing portion 232, the second sealing portion 233, and the third sealing portion 234 are in contact with the inner surface 201a of the dust collecting case, the coupling surface 201b of the dust collecting case, and the coupling surface 227 of the discharge cover 220, respectively.

As described above, the sealing member 230 according to one embodiment of the present invention performs the sealing operation in a state in which the first sealing portion 232 and the second sealing portion 233 are in surface contact from the inner surface 201a of the dust collecting case to the coupling surface 201b, and thus a contact surface area between the sealing member 230 and the dust collecting case 110 may be increased. Since the surface area between the sealing member 230 and the dust collecting case 110 is increased, the sealing effect may be enhanced. Therefore, it may be prevented that the sealing state is damaged by the external shock, and thus the dust in the dust collecting device 100 leaks.

Also, since the sealing member 230 has the restoring force intended to be returned from the second position to the first position, the discharge cover 220 may be easily separated from the dust collecting case 110.

Hereinafter, modified examples of the sealing member 230 will be described.

FIGS. 11 and 12 are views illustrating a first modified example of the sealing member of FIG. 7.

Referring to FIGS. 11 to 12, a sealing member 240 may include a sealing portion 241, a connection portion 246, and a coupling portion 247. When comparing with the sealing member 230 of FIG. 7, the sealing member 240 is different from the sealing member 230 in a structure of the sealing portion 241, and other structures thereof are the same as those of the sealing member 230 of FIG. 7. Hereinafter, the sealing member 240 will be described centering on a difference from the sealing member 230 of FIG. 7, and the repeated description will be omitted.

The sealing portion 241 may include a first sealing portion 242, a second sealing portion 243, a third sealing portion 244, and a fourth sealing portion 245. The sealing portion 241 may further include the third sealing portion 244, when comparing with the sealing portion 231 of the sealing member 230 of FIG. 7.

The third sealing portion 244 may be provided to extend from one side of the second sealing portion 243. The third sealing portion 244 may be provided to extend in parallel with the first sealing portion 242. As illustrated in FIG. 12, the third sealing portion 244 may be provided to be in contact with an outer surface 201c of the dust collecting case while the discharge cover 220 is coupled with the dust collecting case 110. Therefore, the sealing member 240 is in contact with the outer surface 201c of the dust collecting case other than the inner surface 201a and the coupling surface 201b of the dust collecting case, and may enhance the sealing effect.

FIGS. 13 and 14 are views illustrating a second modified example of the sealing member of FIG. 7.

Referring to FIGS. 13 to 14, a sealing member 250 may include a sealing portion 251, a connection portion 255, and a coupling portion 256. When comparing with the sealing member 230 of FIG. 7, the sealing member 250 is different from the sealing member 230 in a structure of the sealing portion 251, and other structures thereof are the same as those of the sealing member 230 of FIG. 7. Hereinafter, the sealing member 250 will be described centering on a difference from the sealing member 230 of FIG. 7, and the repeated description will be omitted.

The sealing portion 251 may include a first sealing portion 252 and a second sealing portion 253. When comparing with the sealing member 230 of FIG. 7, a structure corresponding to the third sealing portion 234 which is in contact with the coupling surface 227 of the discharge cover 220 may be omitted.

As illustrated in FIG. 14, the first sealing portion 252 and the second sealing portion 253 are in contact with the inner surface 201a and the coupling surface 201b of the dust collecting case, and thus the sealing portion 251 may perform the sealing operation. The first sealing portion 252 may be provided so that one side of the first sealing portion 252 is in contact with the inner surface 201a of the dust collecting case at the second position, and the other side thereof is in contact with the coupling surface 228 of the discharge cover 220. Therefore, the sealing member 250 may seal the dust collecting case 110 and the discharge cover 220 with a simpler structure than that of the sealing member 230 of FIG. 7.

FIGS. 25 and 26 are views illustrating a third modified example of the sealing member of FIG. 7.

Referring to FIGS. 25 and 26, a sealing member 510 may have a coupling groove 511 formed at an upper surface thereof. The coupling groove 511 may be installed at the discharge cover 220 to face the coupling surface 201b of the dust collecting case. A first inclined surface 512a and a second inclined surface 512b may be provided at an upper surface of the sealing member 510 to have a v shape which is recessed downward. The first inclined surface 512a and the second inclined surface 512b may form the coupling groove 511. The sealing member 510 may be formed of a material having a restoring force.

As illustrated in FIG. 26, when the discharge cover 220 is coupled with the dust collecting case 110, the sealing member 510 may be in surface contact with a part of a lower portion of the dust collecting case 110. The sealing member 510 may be in surface contact with the dust collecting case 110 while deformed so that the first and second inclined surfaces 512a and 512b surrounds a part of the lower portion of the dust collecting case 110. The sealing member 510 may be in surface contact with a lower surface of the dust collecting case 110, an outer surface thereof connected with the lower surface, and an inner surface thereof connected with the lower surface. Therefore, a contact area between the sealing member 410 and the dust collecting case 110 may be increased, and the sealing effect may be enhanced.

Also, when the discharge cover 220 is separated from the dust collecting case 110, the sealing member 510 may be easily separated from the dust collecting case 110 due to the restoring force. When the sealing member 510 is started to be separated from the dust collecting case 110, the sealing member 510 may be restored to have a shape illustrated in FIG. 25 due to the restoring force, and thus may be easily separated from the dust collecting case 110.

FIGS. 27 and 28 are views illustrating a fourth modified example of the sealing member of FIG. 7.

Referring to FIGS. 27 and 28, a sealing member 520 may include a body portion 521, a contact portion 522, and a coupling groove 523. The body portion 521 may be installed at an upper surface of the discharge cover 220. The contact portion 522 and the coupling groove 523 may be provided at an upper surface of the body portion 521. The contact portion 522 may include a first contact portion 522a and a second contact portion 522b. The first contact portion 522a may be provided to have a shape which extends upward from an upper surface of the body portion 521. The first contact portion 522a may be provided to extend at an obtuse angle with respect to the upper surface of the body portion 521. The second contact portion 522b and the first contact portion 522a may be provided to form bilateral symmetry at the upper surface of the body portion 521. The first and second contact portions 522a and 522b and the upper surface of the body portion 521 may form the coupling groove 523. The coupling groove 523 may be provided as a space surrounded by the first and second contact portions 522a and 522b and the upper surface of the body portion 521. The sealing member 520 may be formed of the material having the restoring force.

As illustrated in FIG. 28, when the discharge cover 220 and the dust collecting case 110 are coupled with each other, the sealing member 520 may be in surface contact with a part of the lower portion of the dust collecting case 110. When the dust collecting case 110 is moved down while being in contact with the upper surface of the body portion 521, the sealing member 520 may be deformed so that the first and second contact portions 522a and 522b are in surface contact with the inner surface and the outer surface of the dust collecting case 110. Therefore, when the discharge cover 220 and the dust collecting case 110 are coupled with each other, the sealing member 520 may be in surface contact with the coupling surface, the inner surface and the outer surface of the lower end of the dust collecting case 110, and thus a sealed area may be increased. Therefore, the sealing effect of the sealing member 520 may be enhanced.

Also, when the discharge cover 220 and the dust collecting case 110 are separated from each other, the sealing member 520 may be easily separated from the dust collecting case 110 due to the restoring force. When the sealing member 520 is started to be separated from the dust collecting case 110, the sealing member 520 may be restored to have a shape illustrated in FIG. 27 due to the restoring force, and thus may be easily separated from the dust collecting case 110.

FIGS. 29 and 30 are views illustrating a fifth modified example of the sealing member of FIG. 7.

Referring to FIGS. 29 and 30, a sealing member 530 may include a contact portion 531 and a support portion 533. The contact portion 531 may be provided to be supported by the support portion 533 and to face the lower end of the dust collecting case 110. The contact portion 531 may be provided to have a triangular cross section. The contact portion 531 may be provided to be inserted into a coupling groove 201d provided at the lower end of the dust collecting case 110. The coupling groove 201d may be provided at the lower end of the dust collecting case 110 to have a shape corresponding to the contact portion 531. The sealing member 530 may be formed of the material having the restoring force.

The support portion 533 may be provided to support the contact portion 531. The support portion 533 may be provided so that one side thereof is coupled to the discharge cover 220 and the other side thereof is coupled to the contact portion 531. The support portion 533 may be provided to be bent a plurality of times. Therefore, as illustrated in FIG. 30, when the dust collecting case 110 is moved down together with the contact portion 531, the support portion 533 may be deformed while a longitudinal length thereof is reduced.

As illustrated in FIG. 30, when the discharge cover 220 and the dust collecting case 110 are coupled with each other, the sealing member 530 may be inserted into and in surface contact with the coupling groove 201d. Therefore, when the discharge cover 220 and the dust collecting case 110 are coupled with each other, the sealing member 530 is in surface contact with the coupling groove 201d of the dust collecting case 110, and thus the sealed area may be increased. Therefore, the sealing effect of the sealing member 530 may be enhanced.

Also, when the discharge cover 220 and the dust collecting case 110 are separated from each other, the sealing member 530 may be easily separated from the dust collecting case 110 due to the restoring force of the support portion 533. When the sealing member 530 is started to be separated from the dust collecting case 110, the sealing member 530 may be restored to have a shape illustrated in FIG. 29 due to the restoring force, and thus may be easily separated from the dust collecting case 110.

FIGS. 31 and 32 are views illustrating a sixth modified example of the sealing member of FIG. 7.

Referring to FIGS. 31 and 32, a sealing member 540 may include a contact portion 541 and a support portion 543. The contact portion 541 may be provided to be supported by the support portion 543 and to face the lower end of the dust collecting case 110. The contact portion 541 may be provided to have a cylindrical shape having a hollow 541a. The contact portion 541 may be provided to face a coupling groove 201e provided at the lower end of the dust collecting case 110. The sealing member 540 may be formed of the material having the restoring force.

The support portion 543 may be provided to support the contact portion 541. The support portion 543 may be provided so that one side thereof is coupled to the discharge cover 220 and the other side thereof is coupled to the contact portion 541.

As illustrated in FIG. 32, when the discharge cover 220 and the dust collecting case 110 are coupled with each other, the sealing member 540 may provide the sealing effect while being in contact with the coupling groove 201e. While the contact portion 541 is pressed by being in contact with the dust collecting case 110, the sealing member 540 may be deformed at the coupling groove 201e to have an elliptical shape. Therefore, a contact surface area between the contact portion 541 and the dust collecting case 110 may be increased, and thus the sealing effect thereof may be enhanced.

Also, when the discharge cover 220 and the dust collecting case 110 are separated from each other, the sealing member 540 may be easily separated from the dust collecting case 110 due to the restoring force of the contact portion 541. When the sealing member 540 is started to be separated from the dust collecting case 110, the sealing member 540 may be restored to have a shape illustrated in FIG. 31 due to the restoring force, and thus may be easily separated from the dust collecting case 110.

FIGS. 33 and 34 are views illustrating a seventh modified example of the sealing member of FIG. 7.

Referring to FIGS. 33 and 34, a sealing member 550 may be provided in a shape which surrounds a part of an upper side of the discharge cover 220. The sealing member 550 may be provided to have a shape which surrounds a coupling groove 220b formed at an upper surface of the discharge cover 220. The coupling groove 220b may be formed at a position facing the dust collecting case 110 so that the dust collecting case 110 may be inserted therein. The sealing member 550 may be formed of the material having the restoring force.

As illustrated in FIG. 34, when the discharge cover 220 and the dust collecting case 110 are coupled with each other, the sealing member 550 may be inserted into the coupling groove 220b together with the dust collecting case 110 while being in surface contact with the lower surface, the inner surface and the outer surface of the dust collecting case 110. Therefore, when the discharge cover 220 and the dust collecting case 110 are coupled with each other, the sealing member 550 is in surface contact with the dust collecting case 110, and thus the sealed area may be increased. Thus, the sealing effect of the sealing member 550 may be enhanced.

Also, when the discharge cover 220 and the dust collecting case 110 are separated from each other, the sealing member 550 may be easily separated from the dust collecting case 110 due to the restoring force of the sealing member 550. When the sealing member 550 is started to be separated from the dust collecting case 110, the sealing member 550 may be restored to have a shape illustrated in FIG. 33 due to the restoring force, and thus may be easily separated from the dust collecting case 110.

Hereinafter, a dust collecting device according to another embodiment of the present invention will be described.

FIG. 15 is an exploded perspective view illustrating the dust collecting device including a dust catching member according to another embodiment of the present invention, FIG. 16 is a cross-sectional view illustrating a cross section of the dust collecting device of FIG. 15, and FIG. 17 is a cross-sectional view illustrating a discharge cover including the dust catching member of FIG. 15.

Referring to FIGS. 15 to 17, a dust collecting device 101 may include the dust collecting case 110, the discharge cover 220, and a dust catching member 265. When comparing with the dust collecting device 100 of FIG. 3, the dust collecting device 101 is different from the dust collecting device 100 in the dust catching member 265, and other structures thereof are the same as those of the dust collecting device 100 of FIG. 3. Hereinafter, the dust collecting device 101 will be described centering on a difference from the dust collecting device 100 of FIG. 3, and the repeated description will be omitted.

First, the dust catching member 265 may be provided at an inner surface of the discharge cover 260. A plurality of dust catching members 265 may be installed at an inner bottom surface of the discharge cover 260. The plurality of dust catching members 265 may be provided to be spaced at regular intervals from each other.

The dust catching member 265 may be configured with a plurality of protrusions which are provided to extend upward from the lower surface of the discharge cover 260 and to be spaced at regular intervals. The plurality of protrusions may be provided so that each cross section thereof is gradually reduced upward. Therefore, the dust catching member 265 may be provided so that a distance between the protrusions is gradually increased upward. The dust catching member 265 may be provided in a comb shape.

As illustrated in FIG. 16, the dust catching member 265 may be provided to be located at the first dust collecting chamber 205a while the discharge cover 260 is coupled to the dust collecting case 110. The dust catching member 265 may be provided so that an upper end thereof is located lower than a grill unit 170.

The dust catching member 265 may be provided so that the dust moved with the rotating air current in the first dust collecting chamber 205a is caught by the plurality of protrusions. The dust catching member 265 may be provided so that the rotating air passes through spaces among the plurality of protrusions and the dust is caught by the protrusions. Therefore, the dust catching member 265 may separate the dust while minimizing obstruction of a flow of the rotating air current in the first dust collecting chamber 205a. Also, the dust catching member 265 may prevent the dust from being scattered in the first dust collecting chamber 205a.

The dust catching member 265 may be provided in a plurality of units each of which has the plurality of protrusions. The plurality of protrusions provided in each unit may be provided to have different distances and heights from each other. Therefore, the dust catching member 265 may remove the dust having various sizes.

FIG. 18 is a view illustrating the discharge cover including a first modified example of the dust catching member of FIG. 15.

Unlike the dust catching member 265, a dust catching member 275 may be provided in a plate shape. The dust catching member 275 may be provided to have a rounded shape having the same curvature. Therefore, the dust catching member 275 may reduce resistance of the rotating air in the first dust collecting chamber 205a.

A plurality of dust catching members 275 may be provided. The plurality of dust catching members 275 may be disposed to have a predetermined distance therebetween. Therefore, the dust catching members 275 may form a passage between the dust catching members 275 through which the rotating air flows. A space formed between the dust catching members 275 may pass only the rotating air, and the dust contained in the air may be caught and separated by the dust catching members 275.

The plurality of dust catching members 275 may form one dust catching unit. For example, the dust catching unit configured with the plurality of dust catching members 275 may be disposed on a lower surface of a discharge cover 270 to have a predetermined distance between the dust catching members 275. As illustrated in FIG. 18, three dust catching units each of which is configured with the plurality of dust catching members 275 may be provided to have predetermined distances among them. Three or more, or three or less dust catching units may be provided.

In one dust catching unit having the plurality of dust catching members 275, each dust catching member 275 may be provided to have a different size. The plurality of dust catching members 275 may be provided so that sizes thereof are gradually increased from a center of the discharge cover 270 toward an edge thereof. Alternatively, the plurality of dust catching members 275 may be provided to have the same size.

FIG. 19 is a perspective view illustrating a dust collecting device including a second modified example of the dust catching member of FIG. 15, and FIG. 20 is a view illustrating a cross section of the dust collecting device of FIG. 19.

Referring to FIGS. 19 and 20, when comparing with the dust catching member 265 of FIG. 17, a dust catching member 290 is different from the dust catching member 265 in a providing position of the dust catching member 290, and other structures thereof are the same as those of the dust catching member 265 of FIG. 17. Hereinafter, the dust catching member 290 will be described centering on a difference from the dust catching member 265 of FIG. 17.

The dust catching member 290 may be installed at an inner surface of the container body 201 which forms a side surface of the first dust collecting chamber 205a. The dust catching member 290 may be provided to extend from the inner surface of the container body 201 toward a center of the first dust collecting chamber 205a. The dust catching member 290 may be provided so that an upper end thereof is located lower than the grill unit 170. A plurality of dust catching members 290 may be provided at the inner surface of the container body 201 to have a predetermined distance therebetween. Although not shown in the drawings, the plurality of dust catching members 290 may be provided to be located at different heights from each other.

Due to the above-described structure, the dust catching member 290 may separate the dust from the air rotated in the first dust collecting chamber 205a. Also, the dust catching member 290 may be provided so that the flow of the rotating air is not restricted by a distance between the plurality of protrusions. Therefore, dust separation efficiency of the dust collecting device 100 may be enhanced.

Referring to FIGS. 3 and 4 again, the dust collecting device 100 may further include a cyclone assembly 140.

The cyclone assembly 140 may be provided at an inside of the dust collecting case 110. The cyclone assembly 140 is provided to generate the rotating air current and to separate the dirt from the air due to the centrifugal force. The rotating air current is generated when the fan motor (not shown) provided in the main body 10 is driven.

The cyclone chambers 142 and 144 in which the rotating air current is generated may be provided at the inside of the dust collecting case 110. In the cyclone chambers 142 and 144, the dust is separated from the air due to the centrifugal force. The cyclone chambers 142 and 144 may include the first cyclone chamber 142 and the second cyclone chamber 144.

The first cyclone chamber 142 may be formed by the grill unit 170, a cyclone body 150, and the dust collecting case 110. The second cyclone chamber 144 may be formed by the cyclone body 150 and at least one cyclone 300.

In another aspect, arrangement relationship of the dust collecting device 100 is as follows. The arrangement relationship of the dust collecting device 100 may be described through a flow of the air. When a direction in which the air introduced through the inlet 111 flows toward the outlet 112 is defined as a flowing direction X, the upper case 120 may be located at a downstream side of the flowing direction X, and the dust collecting container 200 may be located at an upstream side of the flowing direction X. The cyclone assembly 140 may be located between the upper case 120 and the dust collecting container 200. The filter member 134 may be disposed at a downstream side of the cyclone assembly 140 in the flowing direction X to remove the remaining dust from the air that has passed through the cyclone assembly 140. Specifically, the filter member 134 may be disposed at a downstream side of an upper cyclone body 152 in the flowing direction X to transfer the air passing through an exhaust hole 154.

FIG. 21 is a perspective view illustrating the grill unit of FIG. 3, FIG. 22 is a perspective view illustrating the cyclone body of FIG. 3, FIG. 23 is a cut-away perspective view illustrating a coupling structure of the grill unit and the cyclone body of FIG. 3, and FIG. 24 is a view of the dust collecting device taken along a line A-A' of FIG. 4. Hereinafter, at least one cyclone 300 may be referred to as at least one dust separating part or corn. Hereinafter, the upper cyclone body 152 may be referred to as a cover. Hereinafter, the dust collecting container 200 may be referred to as a dust accommodating portion.

Referring to FIGS. 21 to 24, the cyclone assembly 140 may include the grill unit 170 and the cyclone body 150.

The cyclone body 150 may be disposed at the inside of the duct collecting case 110. Also, the cyclone body 150 may be provided so that the grill unit 170 is seated thereat. The cyclone body 150 serves to guide the air discharged from the first cyclone chamber 142, such that the air passes through the grill unit 170 and then flows to the second cyclone chamber 144.

The cyclone body 150 may include the upper cyclone body 152 and a lower cyclone body 156. The grill unit 170 and at least one cyclone 300 in which the second cyclone chamber 144 is formed may be seated at the lower cyclone body 156. A guide tube 155 which guide the air passing through a grill housing 171 to be introduced into the second cyclone chamber 144 from the first cyclone chamber 142 may be formed at the upper cyclone body 152. Also, the upper cyclone body 152 may be coupled to at least one cyclone 300 so that the air introduced through the inlet 111 is guided to at least one cyclone 300. The upper cyclone body 152 will be described later.

A unit seating part 160 may be provided at the lower cyclone body 156 so that one end of the grill unit 170 is seated thereat. A coupling protrusion (not shown) may be formed at the unit seating part 160 so that the grill unit 170 is fixed thereto, and a coupling groove 162 corresponding to the coupling protrusion (not shown) may be formed at the grill unit 170.

The grill unit 170 may be provided at the inside of the dust collecting case 110. Also, the grill unit 170 may be provided to remove the dust having a predetermined size or more from the air discharged from the first cyclone chamber 142.

The grill unit 170 may include a grill body 180 and an inlet tube 182.

The inlet tube 182 may be provided to guide the air introduced from the inlet 111 of the suction port 220a to the first cyclone chamber 142. Therefore, one end of the inlet tube 182 may be provided to be in communication with the inlet 111 of the suction port 220a, and the other end thereof may be provided to be in communication with the first cyclone chamber 142.

The inlet tube 182 may include an inlet hole 170a which is provided at one end of an inlet tube body 182a to be in communication with the inlet 111, and a guide portion 184 which is provided at the other end of an inlet tube body 182a to guide the air to the first cyclone chamber 142. The guide portion 184 may extend from the inlet tube body 182a to be bent in a radial direction with respect to a lengthwise direction of the inlet tube body 182a.

The guide portion 184 may include a discharge guide surface 184a formed to have a curved surface so that the air guided through a first passage P1 in the inlet tube body 182a is spirally discharged in a proceeding direction of the first passage P1. The discharge guide surface 184a allows a flowing direction of the air discharged through the guide portion 184 to be smoothly changed to a circumferential direction.

By such a structure, the air introduced through the suction part 21 may pass through the inlet 111, may be introduced into the inlet tube 182 through the inlet hole 170a, and then may be discharged to the first cyclone chamber 142 through the guide portion 184. The first passage P1 is formed in the inlet tube 182. The first passage P1 is provided so that the air introduced into the first cyclone chamber 142 passes therethrough.

The grill body 180 is provided to remove the dust having the predetermined size or more in the first cyclone chamber 142.

An outlet hole 170b provided to be in communication with the discharge port 122 may be formed at the grill body 180. The air introduced from the first cyclone chamber 142 to the grill body 180 is discharged to an outside of the grill unit 170 through the outlet hole 170b provided at one end of the grill body 180. The air discharged through the outlet hole 170b is introduced into the second cyclone chamber 144 through the guide tube 155.

The grill body 180 is provided to divide the first cyclone chamber 142 from the outlet hole 170b or the discharge port 122 and thus to prevent the dust separated by generating the rotating air current in the first cyclone chamber 142 from passing through the first cyclone chamber 142 and then being discharged through the outlet hole 170b or the discharge port 122. Specifically, a plurality of air passing holes 181 disposed to be spaced a predetermined distance, such that the dust may be prevented from passing therethrough and the air from which the dust is separated by the centrifugation may pass therethrough, may be formed at the grill body 180.

The grill body 180 may be provided to be separated from the inlet tube 182. In the embodiment, the grill body 180 and the inlet tube 182 may be provided to be separated from each other, and also may be integrally formed with each other. The grill body 180 may be provided to surround the inlet tube 182. A second passage P2 may be formed between an outer surface of the inlet tube 182 and the grill body 180. Specifically, the grill body 180 is provided to be spaced a predetermined distance from the outer surface of the inlet tube 182, and the second passage P2 is formed between the outer surface of the inlet tube 182 and the grill body 180.

The first passage P1 which is formed in the inlet tube 182 to guide the air introduced from the inlet hole 170a and the second passage P2 which is formed between the inlet tube 182 and the grill body 180 to guide the air introduced from the first cyclone chamber 142 into the grill body 180 to the outlet hole 170b may be formed together at the grill unit 170. The first and second passages P1 and P2 may be formed in the same direction. In a different point of view, the inlet tube body 182a and the grill body may be disposed so that center lines thereof in a lengthwise direction coincide with each other.

Since the first and second passages P1 and P2 are disposed together at an inside of the grill unit 170, a structure of the cyclone assembly 140 may be simplified. Also, since the first and second passages P1 and P2 are disposed at the inside of the grill unit 170 in the same direction, it is not necessary to provide separately an air tube which guides the air introduced to introduce the air from the suction part 21 to the cyclone chambers 142 and 144, and since the air introduced from the suction part 21 may be directly introduced into the cyclone chambers 142 and 144, passage resistance may be reduced.

The cyclone assembly 140 may include an air current forming part 166. The air current forming part 166 is provided so that the air guided from the inlet tube 182 to the first cyclone chamber 142 may be rotated.

The air current forming part 166 is provided so that the air introduced into the first cyclone chamber 142 forms the rotating air current. The air current forming part 166 is provided at the cyclone body 150. Also, the air current forming part 166 is provided so that the air passing through the first passage P1 forms the rotating air current while being discharged to the guide portion 184 and introduced into the first cyclone chamber 142. In the embodiment of the present invention, the air current forming part 166 is formed at the cyclone body 150, but an arrangement and a shape of the air current forming part 166 may be changed variously.

The air current forming part 166 may be formed along a circumference of the grill unit 170. That is, the air current forming part 166 is may be disposed at the cyclone body 150 along the circumference of the grill unit 170.

The air current forming part 166 may include a first air current guide surface 167 and a second air current guide surface 168.

The first air current guide surface 167 is a guide surface of which at least a part is formed to be concave and with which the air discharged from the inlet tube 182 is in contact, such that the air guided to the first cyclone chamber 142 is rotated in a circumferential direction centering on the grill unit 170. That is, the first air current guide surface 167 is provided to be concave, such that a flowing direction of the air discharged to the guide portion 184 is curved in the circumferential direction. Also, the first air current guide surface 167 may be formed to have a curved surface, such that a direction of the air discharged from the guide portion 184 is smoothly changed. A shape of the first air current guide surface 167 may be modified variously.

The second air current guide surface 168 is a guide surface which is formed to be inclined toward the first cyclone chamber 142 in the circumferential direction centering on the grill unit 170. In the embodiment of the present invention, since the grill unit 170 is disposed at a lower portion of the cyclone body 150, the second air current guide surface 168 is provided to protrude downward from the cyclone body 150 in the circumferential direction centering on the grill unit 170. By such a structure, the air rotated in the circumferential direction by the first air current guide surface 167 may flow toward the first cyclone chamber 142.

Since the guide portion 184 provided at the end of the inlet tube 182 and the air passing hole 181 of the grill body 180 are provided adjacent to each other, there may be a problem in that the air discharged from the guide portion 184 is directly introduced into the air passing hole 181. To solve the problem, the grill unit 170 may further include an air current forming rib 186.

The air current forming rib 186 may be provided toward the first cyclone chamber 142 to be adjacent to the guide portion 184. By providing the air current forming rib 186, the air discharged from the guide portion 184 may be spaced from the grill body 180 and then may be introduced into the first cyclone chamber 142.

The grill unit 170 may further include a flange grill part 188.

The flange grill part 188 may be provided to divide the first cyclone chamber 142 from the first dust collecting chamber 205a. The flange grill part 188 may be formed to extend from the outer surface of the inlet tube 182 to prevent the dust collected in the first dust collecting chamber 205a from flowing back toward the first cyclone chamber 142.

The flange grill part 188 may have a grill shape to prevent movement of the dust. Also, the flange grill part 188 may be in contact with a lower portion of the grill body 180 to prevent the dust separated by the centrifugation from being moved to the second passage P2. The plurality of air passing holes 181 may also be formed at flange grill part 188, like the grill body 180.

Further, the flange grill part 188 may be provided to be inclined toward the first dust collecting chamber 205a, such that the air is prevented from flowing back from the first dust collecting chamber 205a toward the first cyclone chamber 142. That is, since the flange grill part 188 has a flange shape which is inclined toward the first dust collecting chamber 205a between the first cyclone chamber 142 and the first dust collecting chamber 205a, the air may be effectively prevented from flowing back from the first dust collecting chamber 205a.

The cyclone assembly 140 may further include the second cyclone chamber 144.

The second cyclone chamber 144 may be disposed in a radial direction of the first cyclone chamber 142. The second cyclone chamber 144 may be provided at an inside of at least one cyclone 300. Further, the second cyclone chamber 144 may be provided to perform secondarily the centrifugation with respect to the air from which the dust is primarily separated by the first cyclone chamber 142. Specifically, the air introduced from the first cyclone chamber 142 into the grill unit 170 flows to the at least one cyclone 300 through the guide tube 155 of the cyclone body 150, and then is secondarily separated from the dust through the centrifugation in the second cyclone chamber 144 provided in the at least one cyclone 300.

The at least one cyclone 300 may be disposed to separate the dust from the air introduced through the inlet 111.

The at least one cyclone 300 may be disposed at the dust collecting case 110.

The at least one cyclone 300 may be disposed at the inside of the dust collecting case 110 to separate the dust from the air introduced through the inlet 111. Specifically, the at least one cyclone 300 may be disposed along a circumference of the lower cyclone body 156.

The second cyclone chamber 144 may be formed at an inside of the at least one cyclone 300. In the second cyclone chamber 144, the dust is centrifugally separated from the air.

The at least one cyclone 300 may include an air introducing hole 301 and a dust discharging hole 302. The air introducing hole 301 may be provided so that the air introduced through the inlet 111 is introduced into the at least one cyclone 300. The dust discharging hole 302 may be provided to be opened toward the dust collecting container 200. Alternatively, the dust discharging hole 302 may be provided to be in communication with the dust collecting container 200. Also, the air introducing hole 301 may be located at an upper portion in a lengthwise direction L of the at least one cyclone 300. The dust discharging hole 302 may be located at a lower portion in the lengthwise direction L of the at least one cyclone 300. That is, the dust discharging hole 302 may be provided tougher with the air introducing hole 301 in the lengthwise direction L of the at least one cyclone 300 so that the dust separated from the air introduced through the air introducing hole 301 is discharged therethrough.

In another aspect, the at least one cyclone 300 may include a body 303, the air introducing hole 301 and the dust discharging hole 302. The body 303 forms an exterior of the at least one cyclone 300, and the air introducing hole 301 and the dust discharging hole 302 may be formed at both ends of the body 303, respectively.

The air introducing hole 301 may be relatively wide, and the dust discharging hole 302 may be relatively narrow. That is, a width of the air introducing hole 301 may be larger than that of the dust discharging hole 302. This is to maximize dust separation efficiency of the at least one cyclone 300. That is, since the width of the dust discharging hole 302 is formed smaller than that of the air introducing hole 301, the centrifugal force of the air containing the dust, i.e., the contaminant air may be increased. A greater centrifugal force may be generated at the dust discharging hole 302 having the relatively small width.

The body 303 may include at least one of a flat surface and a curved surface. The curved surface may include at least one of a curved surface which is convex in an outer direction of the at least one cyclone 300 and a curved surface which is concave in an inner direction of the at least one cyclone 300.

The at least one cyclone 300 may have a truncated cone shape. The air introducing hole 301 may be provided at one end of the at least one cyclone 300, and the dust discharging hole 302 may be provided at the other end thereof. A diameter of the air introducing hole 301 may be greater than that of the dust discharging hole 302. When the at least one cyclone 300 may have the truncated cone shape, the body 303 may have the flat surface. However, a shape of the at least one cyclone 300 is not limited to the truncated cone shape.

The at least one cyclone 300 may have a symmetric shape with respect to an axis S of symmetry which is in parallel with the lengthwise direction L of the at least one cyclone 300.

A cleaner 1 according to one embodiment of the present invention may include a canister type, an up-right type and a handy type, but the present invention is not limited thereto.

In this specification, exemplary embodiments of the present invention have been classified into the first, second and third exemplary embodiments and described for conciseness. However, respective steps or functions of an exemplary embodiment may be combined with those of another exemplary embodiment to implement still another exemplary embodiment of the present invention.

The invention claimed is:

1. A cleaner comprising a dust collecting device for separating dust from air, wherein the dust collecting device comprises:
    a dust collecting case comprising a dust discharging port configured to collect dust and discharge the collected dust when opened;
    a discharge cover coupled to one side of the dust collecting case and configured to open and close the dust discharging port; and
    a sealing member comprising:
        a first portion provided to extend along an inner surface of the dust collecting case when the dust discharging port is closed,
        a second portion extending from the first portion and extending along a coupling surface of the dust collecting case when the dust discharging port is closed, and
        a third portion configured to contact the discharge cover,
    wherein the coupling surface is configured to move the second portion to contact the third portion to create a seal between the discharge cover and the dust collecting case when the dust discharging port is closed.

2. The cleaner of claim 1, wherein the sealing member comprises:
    a sealing portion, comprising the first portion, the second portion, and the third portion, provided to be in surface contact with the inner surface and the coupling surface; and
    a connection portion connected to the sealing portion and configured to vary a position of the sealing portion.

3. The cleaner of claim 2, wherein:
    the first portion is configured to extend from the connection portion and provided to be in contact with an inner surface of the dust discharging port and thus to be sealed; and
    the second portion is configured to extend from one side of the first portion and provided to be in contact with the coupling surface and thus to be sealed.

4. The cleaner of claim 3, wherein:
    the first portion is formed to have a first angle with respect to the second portion, and
    the first angle is smaller than 90°.

5. The cleaner of claim 3, wherein the third portion is configured to extend from one side of the connection portion and provided to be in contact with the discharge cover at a lower portion of the first portion and configured to be sealed.

6. The cleaner of claim 2, wherein the sealing member further comprises a coupling portion configured to extend from one side of the connection portion and provided to be coupled to an inside of the discharge cover.

7. The cleaner of claim 6, wherein the coupling portion is provided so that the sealing member is coupled to and separated from the discharge cover.

8. The cleaner of claim 1, wherein the sealing member is formed of a material having a restoring force.

9. The cleaner of claim 3, wherein:
    the sealing member is configured with the second portion located between the dust collecting case and the discharge cover while the dust collecting case and the discharge cover are coupled to each other, and
    at least a part of the second portion is located at an outside of the discharge cover while the dust collecting case and the discharge cover are separated from each other.

10. A dust collecting device applied to a cleaner, the device comprising:
    a dust collecting case comprising a dust discharging port configured to discharge dust collected within the dust collecting case when opened;
    a discharge cover coupled to one side of the dust collecting case and configured to open and close the dust discharging port; and
    a sealing member installed along a surface in which the dust collecting case faces the discharge cover,
    wherein:
        the sealing member comprises:
            a first portion extending along an inner surface of the dust collecting case when the dust discharging port is closed,
            a second portion extending from the first portion and extending along a coupling surface of the dust collecting case when the dust discharging port is closed, and
            a third portion configured to contact the discharge cover, and
        the coupling surface is configured to move the second portion to contact the third portion to create a seal between the dust collecting case and the discharge cover.

11. The device of claim 10, wherein the sealing member comprises:
    a sealing portion, comprising the first portion, second portion, and the third portion, provided to be in surface contact with the inner surface of the dust discharging port and the coupling surface of the dust collecting case; and
    a connection portion connected in a manner that the sealing portion is able to be moved to a first position and a second position.

12. The device of claim 11, wherein:
    in the sealing member, the sealing portion is located at the first position while the dust collecting case and the discharge cover are separated from each other, and
    the sealing portion is located at the second position to seal the dust collecting case and the discharge cover while the dust collecting case and the discharge cover are coupled to each other.

13. The device of claim 11, wherein the sealing portion comprises:
    the first portion is configured to extend from the connection portion and provided to be in contact with an inner surface of the dust discharging port and thus to be sealed; and
    the second portion is configured to extend from one side of the first portion and provided to be in contact with the coupling surface and thus to be sealed.

14. The device of claim 13, wherein:
    the first portion is formed to have a first angle with respect to the second portion, and
    the first angle is smaller than 90°.

15. The device of claim 11, wherein the sealing member further comprises a coupling portion configured to extend from one side of the connection portion and provided to be coupled to an inside of the discharge cover.

16. The device of claim 13, wherein the third portion is configured to extend from one side of the connection portion and provided to be in contact with the discharge cover at a lower portion of the first portion and thus to be sealed.

17. The device of claim 10, wherein the sealing member has a restoring force.

18. The device of claim 17, wherein the sealing member is configured to be in surface contact with the inner surface and the coupling surface while a shape of the sealing member is deformed due to coupling between the dust collecting case and the discharge cover.

19. A cleaner comprising a dust collecting device for separating dust from air, wherein:
   the dust collecting device comprises:
   a dust collecting case comprising a dust discharging port configured to collect dust and discharge the collected dust when opened;
   a discharge cover coupled to one side of the dust collecting case and configured to open and close the dust discharging port; and
   a sealing member comprising:
      a first portion configured to be in surface contact along a coupling surface of the dust collecting case when the dust discharging port is closed,
      a second portion extending from the first portion and extending along a coupling surface of the dust collecting case when the dust discharging port is closed, and
      a third portion configured to contact the discharge cover, wherein the coupling surface is configured to move the second portion to contact the third portion to create a seal between the dust collecting case and the discharge cover,
   the sealing member has a restoring force; and
   when the dust discharging port is switched from an opened state to a closed state, a shape of the sealing member is deformed to seal the dust collecting case and the discharge cover.

* * * * *